(12) United States Patent
Hottovy et al.

(10) Patent No.: US 9,358,515 B2
(45) Date of Patent: Jun. 7, 2016

(54) COMPRESSIBLE LIQUID DILUENT IN POLYOLEFIN POLYMERIZATION

(75) Inventors: John D. Hottovy, Kingwood, TX (US); Joel A. Mutchler, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 899 days.

(21) Appl. No.: 12/699,729

(22) Filed: Feb. 3, 2010

(65) Prior Publication Data

US 2011/0190465 A1 Aug. 4, 2011

(51) Int. Cl.
*C08F 2/00* (2006.01)
*C08G 85/00* (2006.01)
*C08F 110/02* (2006.01)
*B01J 8/00* (2006.01)
*B01J 19/18* (2006.01)
*C08F 10/00* (2006.01)

(52) U.S. Cl.
CPC .............. *B01J 8/005* (2013.01); *B01J 19/1837* (2013.01); *C08F 10/00* (2013.01); *B01J 2219/00094* (2013.01); *B01J 2219/00162* (2013.01); *B01J 2219/00272* (2013.01)

(58) Field of Classification Search
USPC ................... 526/64, 77, 352; 422/131
See application file for complete search history.

(56) References Cited

U.S. PATENT DOCUMENTS

| | | | |
|---|---|---|---|
| 4,754,007 A | | 6/1988 | Pullukat et al. |
| 5,391,654 A | | 2/1995 | Ahvenainen et al. |
| 5,565,174 A | * | 10/1996 | Burns et al. .................. 422/131 |
| 6,127,495 A | * | 10/2000 | Rosch et al. .................... 526/82 |
| 6,239,235 B1 | | 5/2001 | Hottovy et al. |
| 6,806,338 B2 | * | 10/2004 | Baann et al. ................... 526/348 |
| 7,014,821 B2 | * | 3/2006 | Hottovy et al. ............... 422/135 |
| 2005/0091021 A1 | * | 4/2005 | Gupta .................. B01J 19/0013 703/12 |
| 2007/0019191 A1 | * | 1/2007 | Marrow et al. ............... 356/301 |
| 2008/0052058 A1 | * | 2/2008 | Odi ............................... 703/12 |
| 2009/0076216 A1 | * | 3/2009 | Kiss et al. ..................... 524/579 |
| 2009/0163678 A1 | * | 6/2009 | Kiss et al. ....................... 526/64 |
| 2009/0186995 A1 | * | 7/2009 | Canich et al. ................ 526/126 |
| 2009/0292085 A1 | * | 11/2009 | Kiss ........................ C08F 10/00 526/64 |

FOREIGN PATENT DOCUMENTS

EP  2 103 634  9/2009
WO  WO 02/090400  11/2002

OTHER PUBLICATIONS

International Application PCT/US2011/022812 Search Report dated Mar. 21, 2011.
Bell, Susan L., PEP Review No. 2005-6, Polyethylene by Borealis' Borstar Process, Dec. 2005.
Author Unknown, Process Economics Program Report 19F, Supercritical Loop Reactor Slurry Process for Producing Polyethylene and Polypropylene, Jun. 1966.

* cited by examiner

*Primary Examiner* — Fred M Teskin
*Assistant Examiner* — Elizabeth Eng
(74) *Attorney, Agent, or Firm* — Fletcher Yoder, P.C.

(57) ABSTRACT

Embodiments of the present application provide a method for manufacturing a polyolefin and a system for implementing the method. The method comprises combining a catalyst with a diluent mixture containing a diluent and an olefin monomer in a polymerization reactor. The diluent may comprise propane, butane, or isobutane, or a combination thereof. The polymerization reactor is operated at a pressure above a critical pressure of the diluent, but below the critical temperature of the diluent.

15 Claims, 12 Drawing Sheets

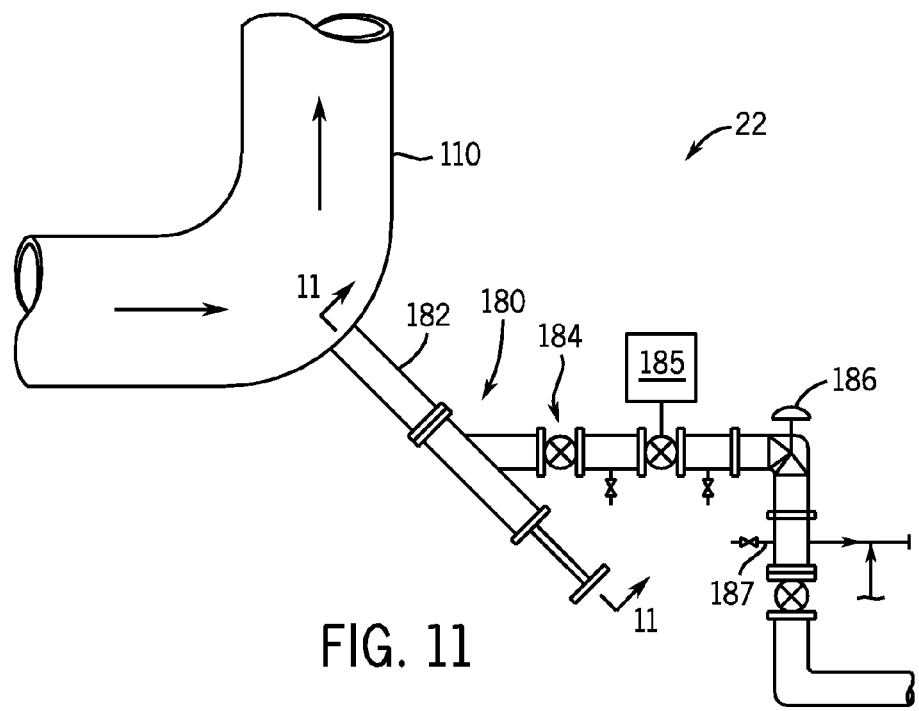
FIG. 11
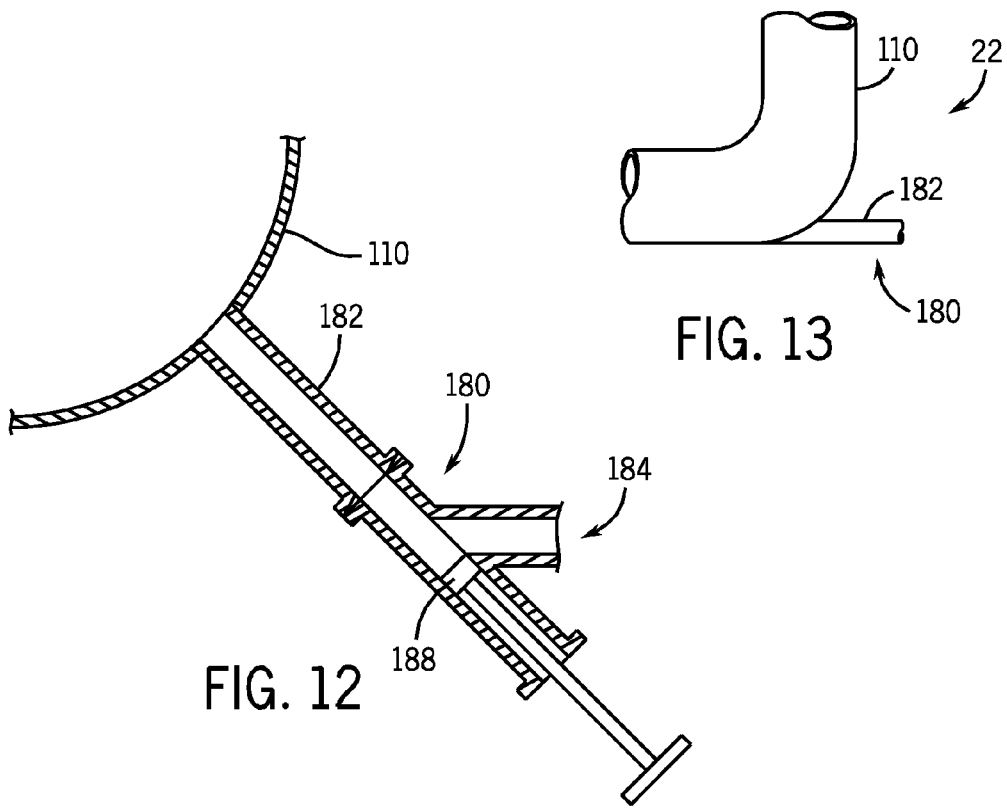
FIG. 12
FIG. 13

COMPRESSIBLE LIQUID DILUENT IN POLYOLEFIN POLYMERIZATION

BACKGROUND

The present techniques relate generally to polyolefin production. More particularly, the present techniques relate to operating regimes for a polyolefin polymerization, including operating polyolefin polymerization reactor systems at pressures above a critical pressure of the diluent employed in the reactor.

This section is intended to introduce the reader to aspects of art that may be related to aspects of the present techniques, which are described and/or claimed below. This discussion is believed to be helpful in providing the reader with background information to facilitate a better understanding of the various aspects of the present techniques. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into long chains (or polymers) have advanced, the polymer products have been increasingly incorporated into various everyday items. For example, polyolefin polymers, such as polyethylene, polypropylene, and their copolymers with each other and other monomers, are used for retail and pharmaceutical packaging, food and beverage packaging (such as juice and soda bottles), household containers (such as pails and boxes), household items (such as appliances, furniture, carpeting, and toys), automobile components, pipes, conduits, and various industrial products.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such as thermal stability, molecular weight, and chemical reactivity, may determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. These processes may be performed near or at petrochemical facilities, which have ready access to the short-chain olefin molecules (monomers and comonomers) such as ethylene, propylene, butene, pentene, hexene, octene, decene, and other building blocks of the much long polyolefin polymers. These monomers and comonomers may be polymerized in a liquid-phase polymerization reactor and/or gas-phase polymerization reactor to form a product including polymer (polyolefin) solid particulates, which may be termed fluff or granules. The fluff may possess one or more melt, physical, rheological, and/or mechanical properties of interest, such as density, melt index (MI), melt flow rate (MFR), copolymer content, comonomer content, modulus, and crystallinity. The reaction conditions within the reactor, such as temperature, pressure, chemical concentrations, polymer production rate, and so forth, may be selected to achieve the desired fluff properties and through these fluff properties control end use product properties.

In addition to the one or more olefin monomers, a catalyst for facilitating the polymerization of the monomers may be added to the reactor. For example, the catalyst may be a particle added via a reactor feed stream and, once added, suspended in the fluid medium within the reactor. An example of such a catalyst is a Ziegler-Natta catalyst containing a tetravalent titanium complex on a silica support. Further, a diluent may be introduced into the reactor. The diluent may be an inert hydrocarbon, such as isobutane, propane, n-pentane, i-pentane, neopentane, and n-hexane, which is liquid at reaction conditions. However, some polymerization processes may not employ a separate diluent, such as in the case of selected examples of polypropylene production where the propylene monomer itself acts as the diluent. A diluent for the loop process may have a low tendency to dissolve the polymer fluff and maintain adequate circulation in a loop reactor. The diluent also transfers heat from the polymerization taking place in the fluff-catalyst particles. Further, a diluent may have a high vapor pressure, and low heat of vaporization, for easy devolitalization of the polymer fluff particles so that the resulting polymer is free of residual diluent.

The discharge of the reactor may include the polymer fluff as well as non-polymer components, such as unreacted olefin monomer (and comonomer), diluent, and so forth. In the case of polyethylene production, the non-polymer components may include a diluent, such as isobutane, having a small amount of unreacted ethylene (e.g., 5 wt. %). This discharge stream is generally processed, such as by a diluent/monomer recovery system, to separate the non-polymer components from the polymer fluff. The recovered diluent, unreacted monomer and other non-polymer components from the recovery system may be treated, for example, by treatment beds and/or a fractionation system and returned as purified or treated feed to the reactor. Some of the components may be flared or returned to the supplier, such as to an olefin manufacturing plant or petroleum refinery. As for the recovered polymer (solids), the polymer may be treated to deactivate residual catalyst, remove entrained hydrocarbons, dry the polymer, and pelletize the polymer in an extruder, and so forth, before the polymer is sent to customer.

Liquid phase polymerization reactors may be run in operating ranges that maintain the contents in a liquid phase below the critical temperature and pressure of the diluent. However, this may not be optimal for certain polymer systems. For example, some polymers may be soluble in liquid diluents under these conditions, leading to reactor fouling. In other cases, bubbles may form under current conditions, causing cavitation of the impeller blades for the circulation pump. This cavitation may damage the impeller blades, forcing expensive repairs and loss of production.

BRIEF DESCRIPTION OF THE DRAWINGS

Advantages of the techniques may become apparent upon reading the following detailed description and upon reference to the drawings in which:

FIG. 11 is a diagrammatical representation of an exemplary continuous takeoff discharge of the polymerization reactor of FIG. 8, in accordance with embodiments of the present techniques;

FIG. 12 is a cross section along line 11-11 of FIG. 11 showing a ram valve arrangement in the continuous take off discharge assembly, in accordance with embodiments of the present techniques;

FIG. 13 is a diagrammatical representation of a tangential location for the continuous take off assembly, in accordance with embodiments of the present techniques.

DETAILED DESCRIPTION OF SPECIFIC EMBODIMENTS

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the present techniques, the liquid phase of the polyolefin polymer slurry in a polyolefin polymerization reactor (e.g., in a loop slurry reactor, autoclave-type reactor, continuously-stirred reactor vessel, other liquid-phase reactors, etc.) is generally maintained above its critical pressure yet below its critical temperature. Generally, the critical temperature of a solvent is the temperature at which all inter-molecular forces drop to zero, and the distinction between a liquid and a gas no longer exists. The critical pressure is the vapor pressure of a solvent at the critical temperature. Above the critical pressure, but below the critical temperature, the liquid phase becomes compressible. The critical temperature and pressure are discussed in greater detail in section II below.

Figure 2:
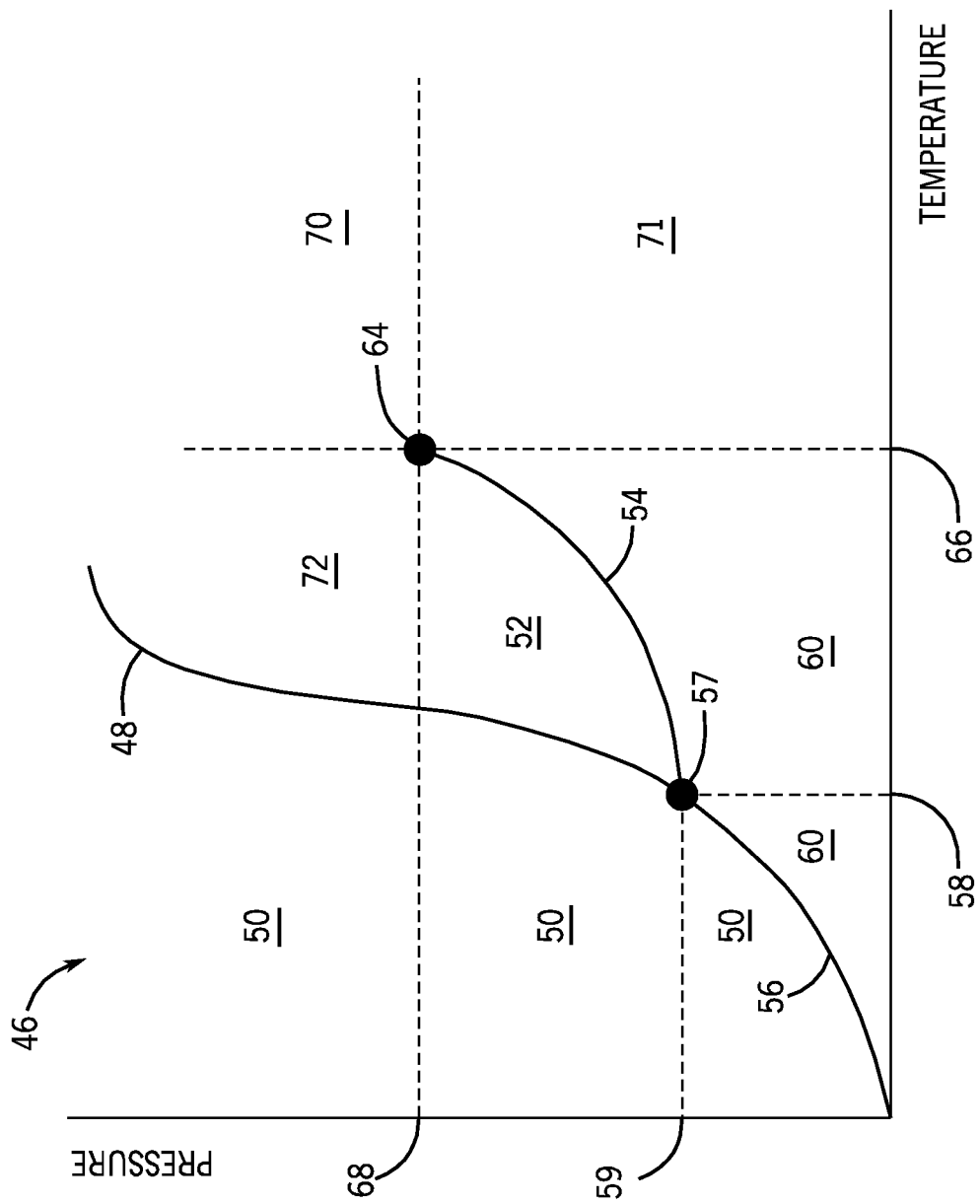
FIG. 2 is a general phase diagram for a pure light hydrocarbon, such as propane or isobutane used in prophetic examples of the present techniques.

Advantageously, as discussed with respect to FIG. 2 below, such an operating regime may lead to reduced costs and improved operability associated with the production of the polyolefin, e.g., polyethylene, polypropylene, and their copolymers, etc. Specifically, operating below the critical temperature may avoid sintering of the linear low density polyethylene (LLDPE), which may reduce fouling. Further, operating above the critical pressure of the mixture may avoid two-phase formation in the diluent, which may prevent formation of a head space in the reactor or cavitation of the circulation pump.

The use of propane as a diluent in this operating regime may provide additional advantages. Propane mixtures will generally have a lower density than higher molecular weight diluents, such as isobutane, which may lower the energy used to circulate (i.e., pump fluid around) the reactor by as much as 3-10% for the same pump configuration. For example, an isobutane diluent mixture containing about 6.5 mol % ethylene and about 1.5 mol % hydrogen, at a temperature of about 208° F. and a pressure of about 800 psia, may have a density of about 0.35 g/cm$^3$. In contrast, a similar propane mixture under the same conditions may only have a density of about 0.27 g/cm$^3$. The lower density propane may allow for greater average reactor solids as measured by techniques known in the art. Propane is also less efficient at dissolving LLDPE than isobutane (e.g., with a solubility parameter of about 5.3 (cal/cm$^3$)$^{0.5}$ for propane versus about 5.9 (cal/cm$^3$)$^{0.5}$ for isobutane), which may improve solvent removal, or flashing, of low molecule polymer, reducing the potential for fouling in downstream equipment. Further, propane is less soluble in polyethylene (PE) than isobutane. For example, at about 208° F. and about 800 psia, PE in a propane diluent may contain about 2.8 wt % propane, while PE in an isobutane diluent may contain about 6.1 wt % isobutane. The solubility difference may result in a harder, less adhesive polymer in propane diluents versus isobutane diluents, which may also lower the potential for fouling. For at least these reasons, among others, the present techniques of operating with a propane diluent in the compressible-liquid regime may better accommodate the implementation and operation of relatively large-scale reactor systems, for example, loop slurry reactors with a volume of greater than, for example, 70,000 gallons.

In general, the compressible-liquid regime, i.e., where the liquid phase of the polymer slurry is maintained above its critical pressure yet below its critical temperature, may be labeled as a semi-supercritical or quasi-supercritical fluid. In certain instances, the polymer-slurry liquid phase is primarily diluent, e.g., inert hydrocarbon. In addition, the liquid phase may include monomer, comonomer, hydrogen, and other components. The critical pressure and critical temperature of the liquid phase in the polymer-slurry will vary as a function of the diluent(s) employed and the concentrations of the components in the polymer-slurry liquid phase, for example, hydrocarbon, diluent, monomer, comonomer, etc. Therefore, the choice of diluent or combinations of diluents, employed in the polymer slurry circulating in the loop reactor, may be selected based on a desired critical temperature corresponding to desired operating temperature ranges of the loop reactor, for example.

The diluent may be an inert hydrocarbon that is a liquid at reaction conditions, such as isobutane, propane, n-pentane, i-pentane, neopentane, n-hexane, heptanes, cyclohexane, cyclopentane, methylcyclopentane, ethylcyclohexane, isooctane and the like. A purpose of the diluent is generally to suspend the catalyst particles and polymer within the reactor. The diluent may be chosen to provide a desired critical temperature and critical pressure for the liquid phase in the polymer slurry and to facilitate conducting operations of the loop reactor in a semi-supercritical region. Further, a blend of diluents may be used to adjust the critical pressure of the liquid phase.

The use of diluents in this semi-supercritical regime may provide a number of advantages over the use of diluents within previous operating regimes. For example, in the production of linear low density polyethylene (LLDPE), too high of an operating temperature may cause fouling due to increased solubility in the diluent or melting of the polymer, among others. Accordingly, the use of supercritical diluents having too high of a critical temperature may be problematic. Further, in comparison to operating below both the critical temperature and the critical pressure, diluents in the present semi-supercritical operating regime generally have some compressibility, which may reduce the formation of bubbles in the circulating slurry in the loop reactor and provide other benefits. In addition, some diluents, such as propane, have lower densities than others, such as discussed above for isobutane, requiring less power from the circulation system. Further, the solubility of a polyethylene polymer in the propane may be lower than other diluents, such as isobutane, which may decrease the potential for softening and swelling of the polymer in the reactor. Lastly, operation above the critical pressure may facilitate removal/recovery of diluent, advantageously lowering the energy input in diluent flashing/recovery downstream of the reactor. More specifically, using a diluent at a higher pressure will generally allow for flashing at lower energy input, facilitating solvent removal.

However, operating with diluents having a high vapor pressure, such as propane, may also be problematic. For example, the critical pressure for propane is about 615 psia at the critical temperature of about 206° C., while the critical pressure for isobutane is about 530 psia at the critical temperature of about 275° C. Thus, propane may require more compression than isobutane and thus may require more energy to pressurize the propane after removal from the fluff so that it can be condensed and recycled. This disadvantage may be offset by recovering greater than 50%, or 80 to 90 wt %, or greater than 90% of the recycled diluent at a high enough pressure so that it can be condensed with out compression. The enhanced recovery may be accomplished by operating the separation vessel or cyclone at a relatively high pressure, such as greater than about 180 psia, and adding heat to the slurry with heated flashlines (i.e., the line from the reactor to the flash tank or cyclone). The flashed propane may then be condensed in a heat exchanger without further compression.

To facilitate discussion of the present techniques, the disclosure is presented in sections. Section I provides an overview of an exemplary polyolefin production process in which a liquid phase reactor would be used. Section II discusses the use of semi-supercritical diluents in the production of polyolefins. Section III discusses a polymerization reactor system that may employ semi-supercritical diluents. Section IV discusses the diluent/monomer recovery system that may recover diluent and unreacted monomer from the effluent that discharges from the polymerization reactor. Section V focuses on the cooling of the polymerization reactor. Section VI discusses exemplary pump systems for loop reactors. Section VII discusses a continuous takeoff system for removing polymer fluff and diluent from the reactor. Section VIII discusses the extrusion/loadout system that converts the raw polyolefin particles to polyolefin pellets for distribution to the customer. Although the discussion may focus on the production of polyethylene and its copolymers, the disclosed techniques may afford benefits when diluents are used in the production of other polyolefins, such as polypropylene, polybutylene, and so on. Finally, it should be apparent that the various techniques may be implemented in a multiplicity of combinations.

I. Polyolefin Production Process—An Overview

In the production of polyolefin, the polymerization reactor(s), which polymerize monomer into polyolefin, and the extruder(s), which convert the polyolefin into polyolefin pellets, may be continuous operations. However, a variety of both continuous and batch systems may be employed throughout the polyolefin process. An exemplary nominal capacity for a typical polyolefin plant is about 900-1200 million pounds of polyolefin produced per year. Exemplary hourly design rates may be approximately 85,000 to 150,000 pounds of polymerized polyolefin per hour and 145,000 to 165,000 pounds of extruded polyolefin per hour. Future reactors may produce as much as 280,000 to 320,000 pounds of polymerized polyolefin per hour. A benefit of large reactors may be lower unit costs (i.e., per unit mass, i.e., pound, of polyolefin) for capital investment to construct the reactor system, as well as for the fixed costs and operating costs to maintain and operate the reactor, and so on.

Figure 1:
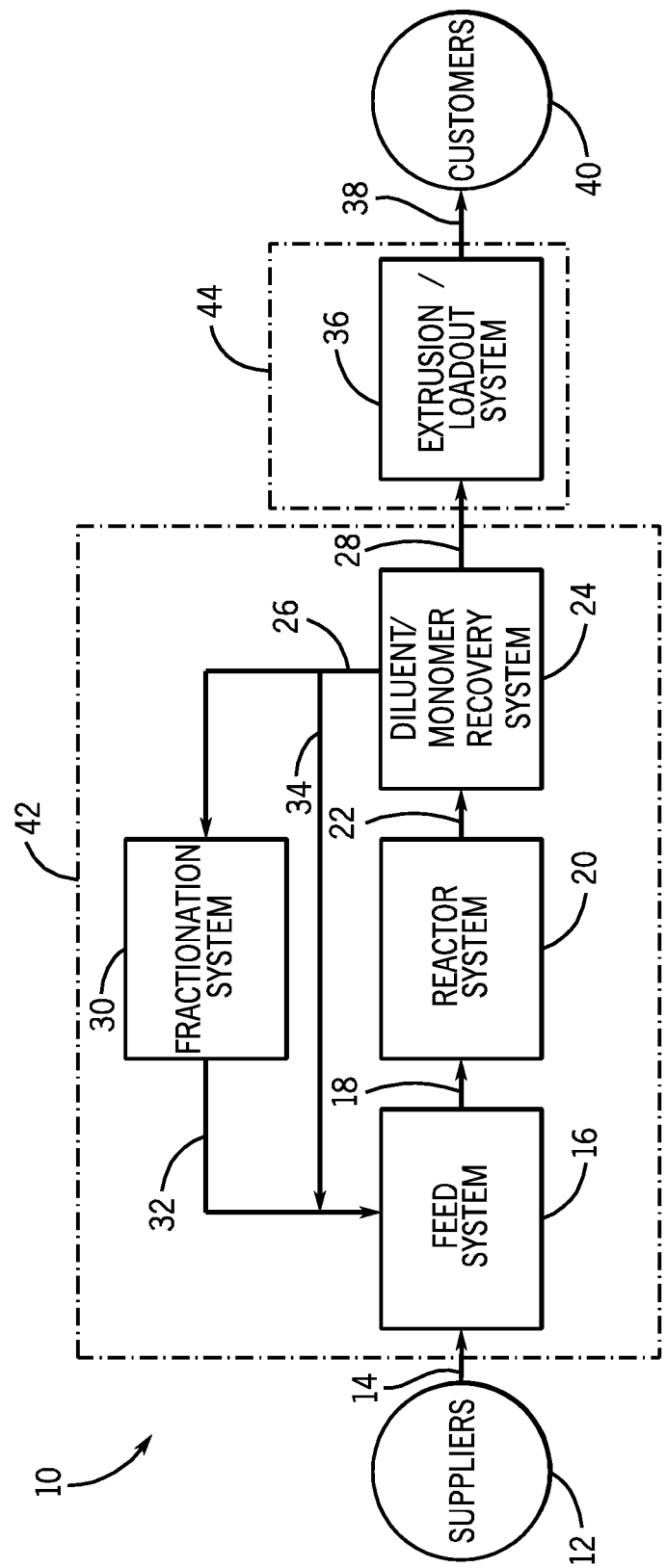
FIG. 1 is a block diagram of an exemplary polyolefin production process, in accordance with embodiments of the present techniques.

An exemplary manufacturing process 10 for producing polyolefins, such as polyethylene homopolymer, polypropylene homopolymer, and/or their copolymers with other monomers is depicted in the block diagram in FIG. 1. Various suppliers 12 may provide reactor feedstocks 14 to the manufacturing system 10 via pipelines, trucks, cylinders, drums, and so forth. The suppliers 12 may include off-site and/or on-site facilities, such as, for example, olefin plants, refineries, catalyst plants, and the like. Examples of possible feedstocks 14 include olefin monomers and comonomers (such as ethylene, propylene, butene, hexene, octene, and decene), diluents (such as non-compressible (liquid) propane, isobutane, n-hexane, and n-heptane), chain transfer agents (such as hydrogen), catalysts (such as Ziegler catalysts, Ziegler-Natta catalysts, chromium catalysts, and metallocene catalysts), co-catalysts (such as triethylaluminum alkyl, triethylboron, and methyl aluminoxane), and other additives. In the case of ethylene monomer, exemplary ethylene feedstock may be supplied via pipeline at approximately 800-1450 pounds per square inch (psia) at 45-65° F. Exemplary hydrogen feedstock may also be supplied via pipeline, but at approximately 900-1000 psia at 90-110° F. Of course, a variety of supply conditions may exist for ethylene, hydrogen, and other feedstocks 14.

A. Feed System

The suppliers 12 may provide feedstocks 14 to a reactor feed system 16, where the feedstocks 14 may be stored, such as in monomer storage and feed tanks, diluent vessels, catalyst tanks, co-catalyst cylinders and tanks, and so forth. In the feed system 16, the feedstocks 14 may be treated or processed prior to their introduction as feed 18 into the polymerization reactors. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that only a relatively small amount of fresh make-up diluent as feedstock 14 may be utilized, with a majority of the diluent fed to the polymerization reactor recovered from the reactor effluent.

The feed system 16 may prepare or condition other feedstocks 14, such as catalysts, for addition to the polymerization reactors. For example, a catalyst may be activated and then mixed with diluent (e.g., isobutane or hexane) or mineral oil in catalyst preparation tanks for subsequent delivery to the polymerization reactor.

Further, the feed system 16 may provide for metering and controlling the addition rate of the feedstocks 14 into the polymerization reactor to maintain the desired reactor stability and/or to achieve the desired polyolefin properties or production rate. For example, a flow meter may be used to measure the flow of ethylene to the reactor. Flow meters that may be used include orifice meters or mass flow meters (e.g., a Coriolis meter by MicroMotion, Inc. of Boulder, Colo.), or a thermal mass flow meter. As orifice meters may require steam heating of the ethylene flow for accurate measurement, mass flow meters may provide an energy savings in embodiments of the present techniques.

Furthermore, in operation, the feed system 16 may also store, treat, and meter recovered reactor effluent for recycle to the reactor. Indeed, operations in the feed system 16 generally receive both feedstock 14 and recovered reactor effluent streams. In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20.

B. Reactor System

The reactor system 20 may include one or more reactor vessels, such as liquid-phase or gas-phase reactors. The reactor system 20 may also include a combination of liquid and gas-phase reactors. If multiple reactors make up the reactor system 20, the reactors may be arranged in series, in parallel, or in any other suitable combination or configuration. Further, different reactors may use the same conditions or different conditions to produce different properties in the polymer. The reactors may be operated at different conditions to make end products that are a combination of polymers from the different reactors and, thus, produce new or optimized end product properties. In the polymerization reactor vessels, one or more olefin monomers are polymerized to form a product including polymer particulates, which may be termed fluff or granules. The fluff may possess one or more melt, physical, rheological, and/or mechanical properties of interest, such as density, melt index (MI), melt flow rate (MFR), copolymer or comonomer content, modulus, impact, hardness, and crystallinity. The reaction conditions, such as temperature, pressure, flow rate, mechanical agitation, product takeoff, component concentrations, polymer production rate, and so forth, may be selected to achieve the desired fluff properties.

In addition to the one or more olefin monomers, a catalyst that facilitates polymerization of the monomer is typically added to the reactor. The catalyst may include particles suspended in the fluid medium within the reactor. In general, Ziegler-Natta catalysts, chrome-based catalysts, metallocenes, and other well-known polyolefin catalysts, as well as co-catalysts, may be used. An example of such a catalyst is a Ziegler-Natta catalyst containing tetravalent titanium on a MgC12 support. Another example is a metallocene catalyst on a sulfated silica-alumina support.

Further, diluent may be fed into the reactor, which may be a liquid-phase reactor, to suspend catalyst and polymer particles during the reaction. As previously mentioned, the diluent may be an inert hydrocarbon that is a liquid at reaction conditions. However, in the present techniques, the diluent may be a mixture chosen to have a favorable critical temperature and pressure for conducting operations in a semi-supercritical regime. For example, in a contemplated embodiment, semi-supercritical propane may be used as the diluent, as discussed in detail in Section II below.

A motive device may be present within the reactor in the reactor system 20. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor. An advantage of using the diluent systems of the present techniques may be a lower motive force used to circulate a slurry through a loop reactor. This lower motive force may result from the decreased density of certain diluents, such as semi-supercritical propane, which may have a density that may be about 10% lower than the density of isobutane at the same temperature. Due to the lower density, a single larger pump may be used in lieu of two smaller pumps (in series), thus saving electrical costs. While the electrical cost savings may depend on the relative size of the pumps used, the single pump may save as much as 10-40% in electrical operating costs over two pumps. Other pump configurations may be used, including multiple pumps having the same or a different design, or a single larger motor driving multiple impellers. In some embodiments, a higher average reactor solids may be achieved by operating in the semi-supercritical or supercritical regions.

C. Diluent/Monomer Recovery, Treatment, and Recycle

The discharge 22 of the reactors within system 20 may include the polymer fluff as well as non-polymer components, such as diluent, unreacted monomer/comonomer, and residual catalyst. The discharge 22 may be subsequently processed, such as by a diluent/monomer recovery system 24, to separate non-polymer components 26 (e.g., diluent and unreacted monomer) from the polymer fluff 28. The diluent/monomer recovery system 24 may have a low-pressure recovery flash (e.g., at about 25 psia) of the diluent/monomer with an associated recycle compression or may eliminate this process step using only a high pressure flash (e.g., at about 180 psia) into a high-pressure separation vessel. A high-pressure separation vessel allows the solvent to flash into a gas and thus separate from the polymer fluff. Accordingly, the diluent vapors may be condensed and recycled to the reactor without the use of a flash-gas compressor.

With or without the low pressure flash, the untreated recovered non-polymer components 26 may be further processed, such as by a fractionation system 30, to remove undesirable heavy and light components. Fractionated product streams 32 may then be returned to the reactor system 20 via the feed system 16. On the other hand, the non-polymer components 26 may recycle more directly to the feed system 16 (as indicated by reference numeral 34), bypassing the fractionation system 30, and thus avoiding the energy consumption of the fractionation system 30. Indeed, in certain embodiments, up to 80-95% of the diluent discharged from the reactor bypasses the fractionation system in route back to the polymerization reactor. As a result, the size of the fractionation columns and associated steam consumption in the downstream fractionation system 30 may be reduced by as much as 70-90%.

The fluff 28 may be further processed within the recovery system 24 and in the extrusion/loadout system 36, to prepare it for shipment, often as pellets 38, to customers 40. Although not illustrated, polymer granules intermediate in the recovery system 24, which may contain active residual catalyst, may be returned to the reactor system 20 for further polymerization, such as in a different type of reactor or under different reaction conditions. The polymerization and diluent recovery portions of the polyolefin manufacturing process 10 may be called the "wet" end 42 or "reaction" side of the process 10, and the extrusion/loadout 36 portion of the polyolefin process 10 may be called the "dry" end 44 or "finishing" side of the polyolefin process 10.

The polymer fluff 28 may be conveyed from the recovery system 24 by a blower or other electrical-mechanical force to the extrusion/loadout system 36. Alternatively, the process pressure itself may be utilized to transport or convey the polymer fluff 28 from the recovery system 24 to the extrusion/loadout system 36. In this technique, the operation of the reactor system 20 and recovery system 24 is more directly coupled to the extruder/loadout system 36, e.g., the fluff may be directly fed to the extruder system from the flash system of the reactor. Such direct or "close" operative coupling may reduce the process residence time of the fluff 28. Thus, the number of intermediate fluff storage vessels (e.g., silos) and associated blower/compressor systems may also be reduced.

In a closely coupled system, the reactor system 20 may have a kill agent system configured to inject a catalyst poison, such as an alcohol, water, CO2, to slow or stop the polymerization reaction. The injection of a kill agent may be performed to slow or stop polymer production, for example, during servicing of an extruder. Once the extruder is fully functional, further catalyst or co-catalyst may be injected into the reactor system 20 to resume production.

D. Extrusion/Loadout System

In the extrusion/loadout systems 36, the fluff 28 may be extruded to produce polymer pellets 38 with the desired mechanical, physical, and melt characteristics. Extruder feed may include additives, such as UV inhibitors, flow enhancers, and peroxides, among others, which are added to the fluff 28 to impart desired characteristics to the extruded polymer pellets 32. An extruder/pelletizer receives the extruder feed, including one or more fluff products 28 and whatever additives have been added. The extruder/pelletizer heats and melts the extruder feed which then may be extruded (e.g., via a twin screw extruder) through a pelletizer die under pressure to form polyolefin pellets. Such pellets may be cooled in a water system disposed at or near the discharge of the pelletizer. The pellets may be conveyed from the pelletizer to the loadout area using a blower, or may be directly carried by the pellet cooling water to the loadout area.

In general, the polyolefin pellets may then be transported to a product load-out area where the pellets may be stored, blended with other pellets, and/or loaded into railcars, trucks, bags, and so forth, for distribution to customers 40. In the case of polyethylene, pellets 38 shipped to customers 40 may include linear low density polyethylene (LLDPE), medium density polyethylene (MDPE), high density polyethylene (HDPE), and enhanced polyethylene. The various types and grades of polyethylene pellets 38 may be marketed, for example, under the brand names Marlex® polyethylene or MarFlex® polyethylene of ChevronPhillips Chemical Company LP, of The Woodlands, Tex., USA.

E. Customers, Applications, and End-Uses

Polyolefin (e.g., polyethylene) pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. Further, it should be emphasized that polyolefins other than polyethylene, such as polypropylene, may form such components and products via the processes discussed below.

Ultimately, the products and components formed from polyolefin (e.g., polyethylene) pellets 38 may be further processed and assembled for distribution and sale to the consumer. For example, a rotomolded sailboat may be outfitted for sale to a consumer, or a pipe line may be assembled and buried for natural gas distribution and sale.

To form end-products or components from the pellets 38, the pellets are generally subjected to further processing, such as blow molding, injection molding, rotational molding, blown film, cast film, extrusion (e.g., sheet extrusion, pipe and corrugated extrusion, coating/lamination extrusion, etc.), and so on. Blow molding is a process used for producing hollow plastic parts. The process may employ blow molding equipment, such as reciprocating screw machines, accumulator head machines, and so on. The blow molding process may be tailored to meet the customer's needs, and to manufacture products ranging from the plastic milk bottles to the automotive fuel tanks mentioned above. Similarly, in injection molding, products and components may be molded for a wide range of applications, including containers, food and chemical packaging, toys, automotive, crates, caps and closures, to name a few.

Extrusion processes may also be used. Polyethylene pipe, for example, may be extruded from polyethylene pellet resins and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, and well casings, to name a few applications. In particular, high-density polyethylene (HDPE), which generally constitutes the largest volume of the polyolefin group of plastics used for pipe, is tough, abrasion-resistant and flexible (even at subfreezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. Pellets 38, such as certain Marlex® HDPE and MDPE resins, offer such flow characteristics, as well as a wide processing window. Furthermore, these polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

Sheet extrusion is a technique for making flat plastic sheets from a variety of pellet 38 resins. The relatively thin gauge sheets are generally thermoformed into packaging applications such as drink cups, deli containers, produce trays, baby wipe containers and margarine tubs. Other markets for sheet extrusion of polyolefin include those that utilize relatively thick sheets, e.g., around 100-250 thousandths of an inch (mil), for industrial and recreational applications, such as truck bed liners, pallets, automotive dunnage, playground equipment, and boats. A third use for extruded sheet, for example, is in geomembranes, where flat-sheet polyethylene material is welded into large containment systems for mining applications and municipal waste disposal.

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding may be used in conjunction with monolayer and/or multilayer coextrusion technologies for producing numerous products, such as labeled bottles. Advantageous properties of the products produced by the blown film process may include clarity, strength, tearability, optical properties, and toughness, to name a few.

The cast film process may differ from the blown film process through the fast quench and virtual unidirectional orientation capabilities. These characteristics allow a cast film line, for example, to operate at relatively high production rates, e.g., several hundred pounds per hour or greater, while producing beneficial optics. Applications in food and retail packaging take advantage of these strengths. Finally, polyolefin pellets may also be supplied for the extrusion coating and lamination industry.

Using either type of film extrusion, linear low density polyethylene, for example, may be extruded from polyethylene pellet resins and used in an assortment of applications due to its flexibility, chemical resistance, durability, processability, cost advantages, and the like. Such applications may include stretch films for palletizing materials, packaging for fresh cut fruits and vegetables, shrink wrap, and other product packaging. Films made from linear low density polyethylene have achieved significant success in unusual applications, such as geomembranes. A geomembrane may be used to isolate a storage pit, such as for a dump or sewer overflow pit, from the surrounding ground, protecting groundwater from contamination. Other applications may include garment bags, bakery films, industrial liners, and the like.

F. Other Feed Streams

Recycle diluent (e.g., propane or isobutane) with entrained monomer may be returned from the diluent/monomer recovery system 24 (e.g., corresponding to stream 34 of FIG. 1) and sent to the polymerization reactor. The amount of entrained monomer may vary, depending on the polymerization efficiency. For example, the relatively low incorporation efficiency of 1-hexene may increase the amount entrained in the recycle diluent stream. In the example of "direct" recycle to the reactor, the recycled diluent may be cooled and passed through a heavies' knockout pot, where heavy components are removed out of a bottom discharge and sent via a centrifugal pump, for example, as feed to the fractionation system 30. The overhead of the knockout pot may be further cooled in a heat exchanger and collected in a recycle diluent surge tank for feed to the reactor. Downstream, a centrifugal pump may deliver the diluent through recycle diluent treaters to the loop slurry reactor. It should be noted that a relatively small amount of fresh diluent (not illustrated) may be added in the fractionation system 30, for example, to make-up for diluent losses in the manufacturing process 10. Furthermore, comonomer (e.g., 1-hexene) may be added at various points in the recycle diluent circuit for addition to the reactor.

II. Semi-Supercritical Diluents in the Production of Polyolefins

The present techniques include the use of diluents or diluent mixtures at temperatures below their critical temperature, but at pressures above their critical pressures. Under these conditions, the diluent may act as a compressible liquid, actually changing volume with pressure. For this reason, diluents in this operating regime may be thought of as being in a semi-supercritical regime. Further, as discussed above, operating with a propane diluent in a semi-supercritical regime may provide advantages over other diluents operating in this temperature/pressure regime. For example, less fouling of the reactor occurs both due to lower solubility of the polymer in a propane diluent versus isobutane (e.g., about 10% lower solubility) and to the lower solubility of propane in the polymer (generally about 35% to 45% of the solubility of isobutane in polyethylene). Further, the decreased density of propane versus isobutane (generally around 2-10% lower) and viscosity (generally around 5-10% lower than isobutane) may lower power requirements for circulation in a loop reactor (or agitation or mixing in an autoclave reactor, for example). Finally, the higher vapor pressure of propane versus isobutane may enhance the removal of diluent from the polymer particles.

The compressibility of the diluent mixture in the semi-supercritical operating regime may allow the reactor to run with a smoother pressure curve versus time, since the volume loss from intermittent product flows out of the reactor will generally be compensated for by the expansion of the solvent. More specifically, in the compressible region above the critical pressure (e.g., about 625 psia for neat propane), volume changes will occur without phase changes that could result in formation of a headspace or cavitation of a pump.

The semi-supercritical operating regime is discussed in more detail in the subsections that follow. In subsection A, the general phase behavior of a light hydrocarbon is discussed. Subsection B details the effects that the additions of ethylene, comonomer, and hydrogen have on the phase behavior are discussed. Subsection C further defines the semi-supercritical operating regime in light of the modified phase behavior shown by the different diluents.

A. The Phase Behavior of a Light Hydrocarbon

The advantages of the operating regimes of the present techniques may be further clarified by a examining the simplified phase behavior of a hydrocarbon, such as those used in diluents for a polyolefin polymerization. The phases of a pure hydrocarbon as a function of temperature and pressure are shown by the phase-diagram 46 depicted in FIG. 2. The phase-diagram 46 has boundary lines separating the regions that correspond to different phases. At the values for temperature and pressure represented by each line, the two phases on each side of the line are substantially in equilibrium. For example, the liquid-solid boundary 48 marks the transition point at which a hydrocarbon in a solid phase 50 melts into a liquid phase 52 as energy input into the system raises the temperature (holding pressure constant). When the system reaches the transition temperature shown by the liquid-solid line 48, the temperature of the system remains substantially constant as the phase transition from solid 50 to liquid 52 occurs. If the energy input is stopped during the phase transition, both phases may continue generally to exist in equilibrium at that constant temperature and constant pressure. Once the transition from one phase to another is completed, continued energy input will again start to raise the temperature of the system (while the pressure remains substantially constant on this example).

Other lines on the pure component phase-diagram 46 indicate the gas-liquid boundary 54 and the gas-solid boundary 56. This later boundary, at which a solid will directly sublime into a gas, only occurs at both temperature and pressure below the triple point 57 of the hydrocarbon. The triple point 57 marks the temperature 58 and pressure 59 at which all three phases, gas 60, liquid 52, and solid 50 may exist in equilibrium, so long as no further energy is input into or removed from the system.

As the temperature and pressure of the hydrocarbon are increased by energy input, the hydrocarbon may reach a critical point 64 when a critical temperature 66 and a critical pressure 68 are exceeded. Specifically, the temperature has exceeded the value to eliminate chemical interactions between the individual hydrocarbon molecules, however the pressure is too high for the molecules to physically move apart and separate into a gas phase. At the critical point 64, the separation between a liquid 52 and a gas 60 phases no longer exists, as the density of both phases are substantially equivalent. Above that temperature and pressure, the hydrocarbon enters a single, new phase that may have properties of both, termed a supercritical fluid 70.

Although a supercritical fluid 70 may provide benefits in certain applications, employing diluents above either the critical temperature 66, without exceeding the critical pressure 68, or above the critical pressure 68 without exceeding the critical temperature 66 may also provide substantial benefits. These regions may be regarded as the semi-supercritical operating regimes. For example, exceeding the critical temperature 66 while not exceeding the critical pressure 68 pushes the hydrocarbon into the superheated vapor 71 operating regime.

The phase discussion above provides an introduction to the use of a semi-supercritical fluid, but it may be noted that the diluent is actually a mixture of the pure light hydrocarbon and a monomer, and may further include a comonomer, such as, for example, hexene, along with a catalyst composition, and, optionally, hydrogen as a chain terminating agent. These additional components may make the phase diagram more complex, depending on the amount of other constituents in the diluent, as discussed in the following subsection.

B. Exemplary Calculations of Critical Temperatures and Pressures

The simplified phase behavior of a pure component, as discussed above, may become more complex when additional components of the diluent mixture are added. Such components may include, for example, ethylene, comonomers (such as hexene or butene), and hydrogen. The behavior of such mixed system may be modeled by commercial engineering design packages to predict the critical temperature and pressure of the mixture. An example of a commercial engineering modeling software package that may be used to model phase behaviors is AspenOne available from Aspen Technology Co. of Cambridge, Mass. The results provided by the modeling software may be used to set the operation limits of the temperature and pressure for operation in the semi-supercritical regime. The exemplary results discussed below were obtained for propane as the hydrocarbon, but similar calculations may be used to obtain the operating limits for isobutane, as well as other diluents that may be operated in the semi-supercritical regime, such as pentane, and butane, among others.

Further, the nature of the critical point itself makes calculations at the critical point difficult. As a material approaches the critical point, the equilibration calculation may take a longer period of time, so the time that the simulations take to stabilize may be substantial, e.g., several hours or even days. Further, the calculations may also use an equation of state to calculate the phase equilibrium which is a close approximation to the measured equilibrium of the mixtures. For this reason, values given in the examples discussed below should be understood as approximations.

1. Critical Temperature and Pressure of Propane Vs. Weight Fraction Ethylene

As the ethylene content is increased in a mixture with propane, the critical pressure may be increased and the critical temperature may be decreased. Without intending to be limited by theory, this may be a result of incorporating the lighter and more easily vaporized ethylene into the mixture with the propane.

Figure 3:
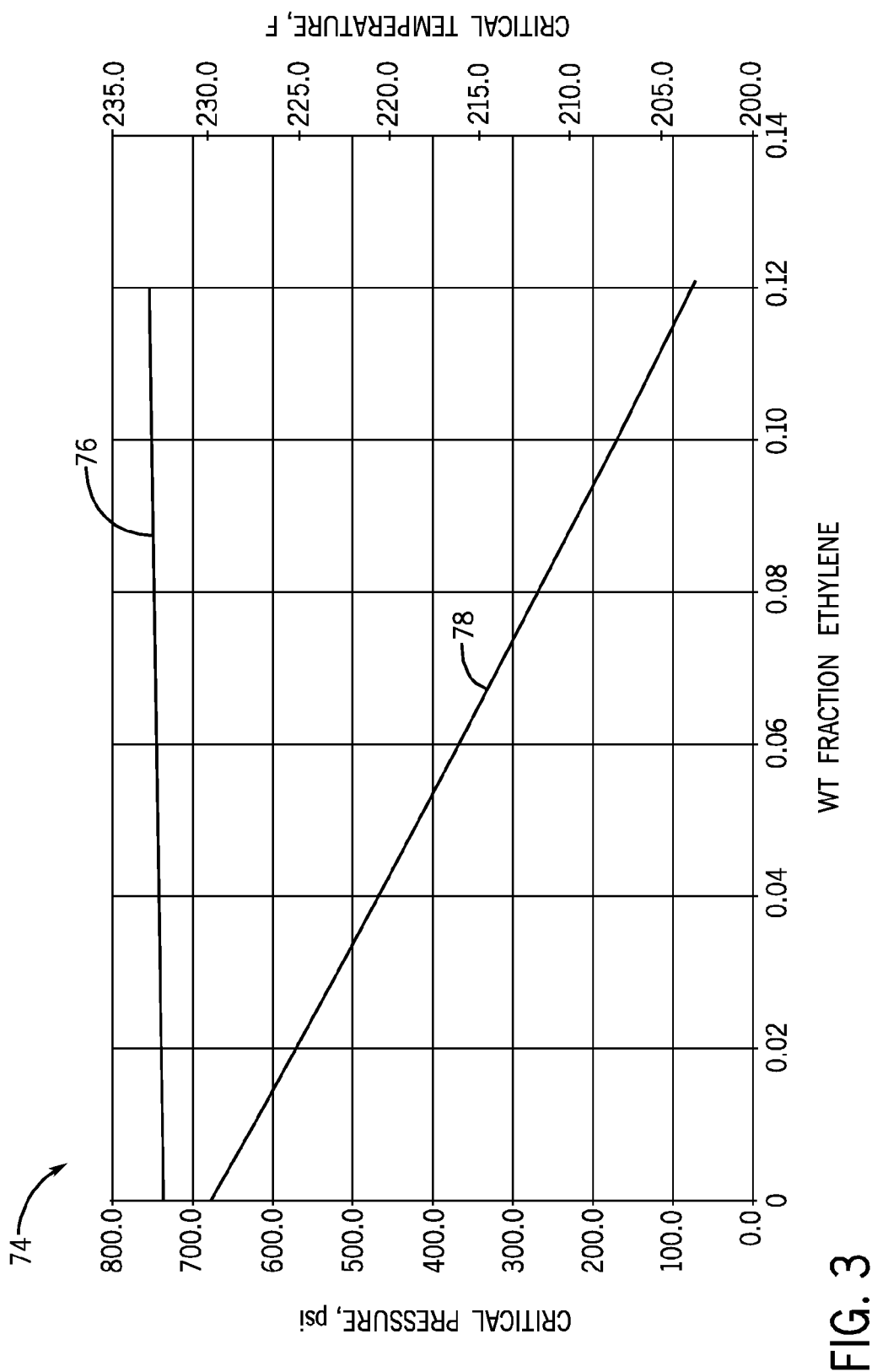
FIG. 3 is a graph showing calculated relationships of critical temperature and critical pressure to ethylene content in a propane diluent, in accordance with prophetic examples of the present techniques.
Figure 4:
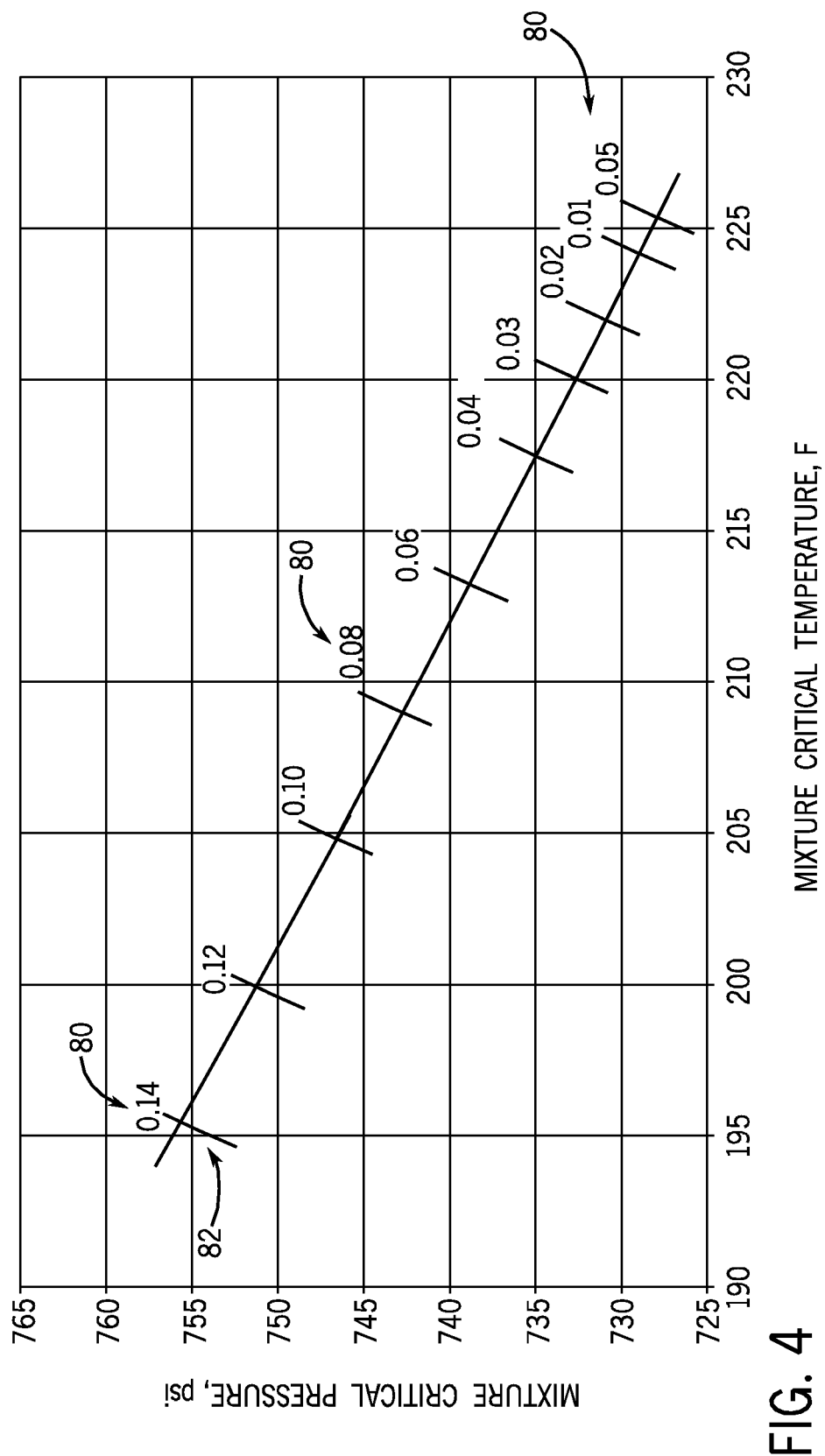
FIG. 4 is a graph showing calculated critical points at different ethylene concentrations in a propane, in accordance with prophetic examples of the present techniques.

The effect of ethylene addition to a diluent may be quantifiable, as shown by FIG. 3, which is a plot showing the calculated effects of increasing ethylene content on the critical temperature and pressure of a diluent mixture based on propane. As seen in this plot, an increase may be seen in the critical pressure 76 of the mixture as the ethylene content is incrementally increased from 0 to 0.12 wt. fraction (i.e., 0 to 12 wt. %). In contrast, a large drop in the critical temperature 78 may occur over the same interval. These changes indicate that the critical point may be more easily reached as increasing amounts of ethylene are added to the propane. This may be more clearly seen in the plot shown in FIG. 4, which charts the calculated critical point of the diluent mixture containing ethylene and propane as the ethylene concentration is changed. In this plot, as the weight fraction of ethylene in the propane, indicated by the labeled hash marks 80 along the line, is increased, the critical point is shifted to the left, i.e., to lower temperatures and to higher pressures. In this chart, the lowest critical temperature calculated for the mixture is at about 0.14 weight fraction ethylene (as indicated by reference numeral 82), and may be about 195° F. The maximum critical pressure calculated for the mixture is also at 0.14 weight fraction ethylene, and may be about 755 psia. Although the values calculated for a mixture of ethylene and propane provide important data for setting limits for the reaction parameters, linear low density polyethylene may be a copolymer containing both ethylene and a comonomer, such as, for example, 1-hexene. Accordingly, calculations were run on mixtures containing 1-hexene in addition to the ethylene and propane, as discussed below.

2. Effects of Adding 1-Hexene and Hydrogen to a Mixture of Ethylene and Propane

Figure 5:
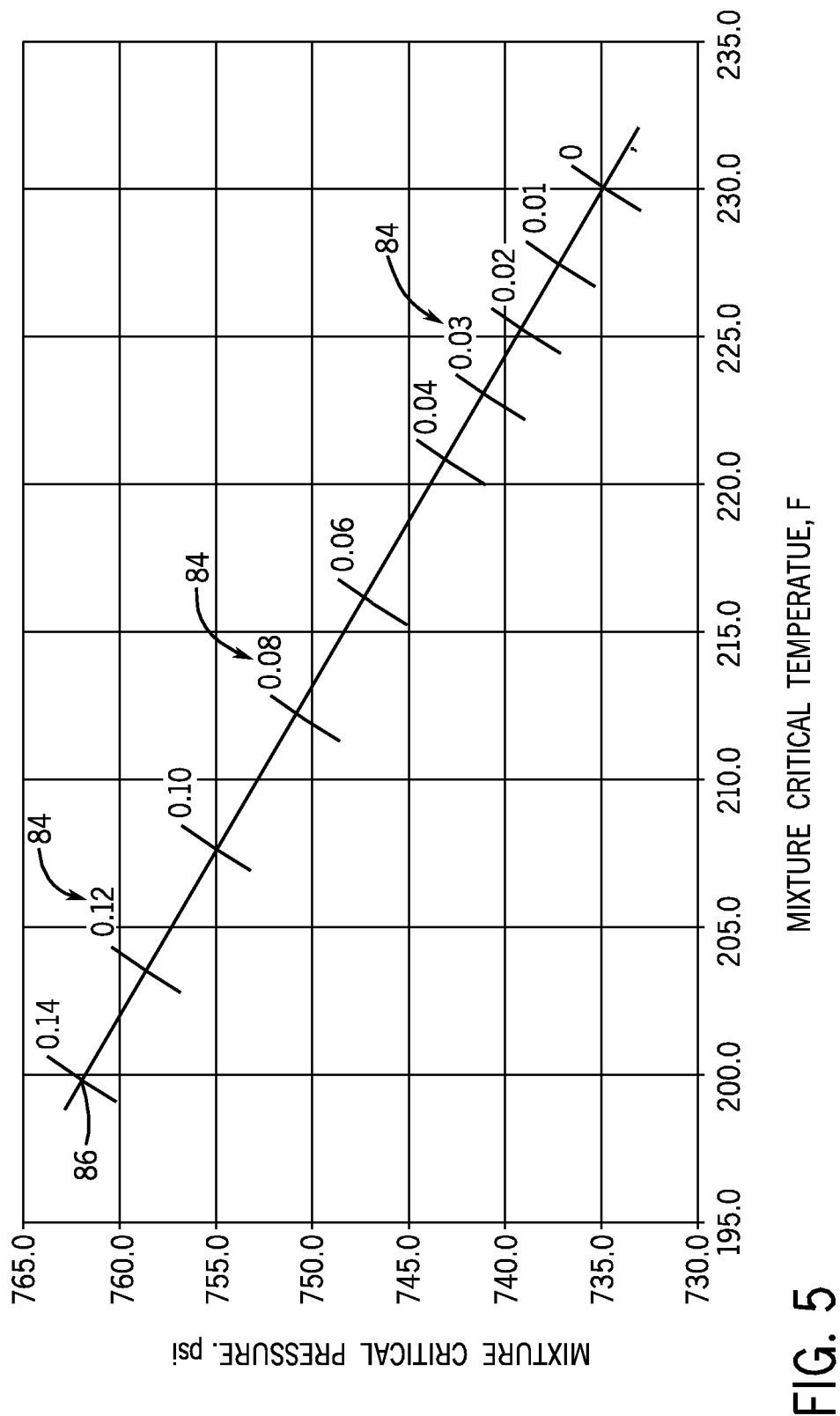
FIG. 5 is a graph showing calculated critical points for different ethylene concentrations in a propane diluent containing 1 wt % 1-hexene, in accordance with prophetic examples of the present techniques.

The results of the critical point calculations for a mixture of ethylene and propane containing 1% 1-hexene are shown in the plot in FIG. 5. As in FIG. 4, the ethylene concentration (in wt. fraction) is indicated by hash marks 84 drawn across the line. As shown in this plot, the addition of 1-hexene may shift both the critical temperature and the critical pressure to higher values. The highest critical pressure and the lowest critical temperature are reached at the highest ethylene concentration, 0.14 weight fraction. At this ethylene concentration, the critical pressure may be about 763 psia, and the critical temperature may be about 200° F. Higher critical pressures and lower critical temperatures will occur for mixtures with higher ethylene content. Eventually, at high ethylene concentrations, the critical conditions will approach those of pure ethylene.

Figure 6:
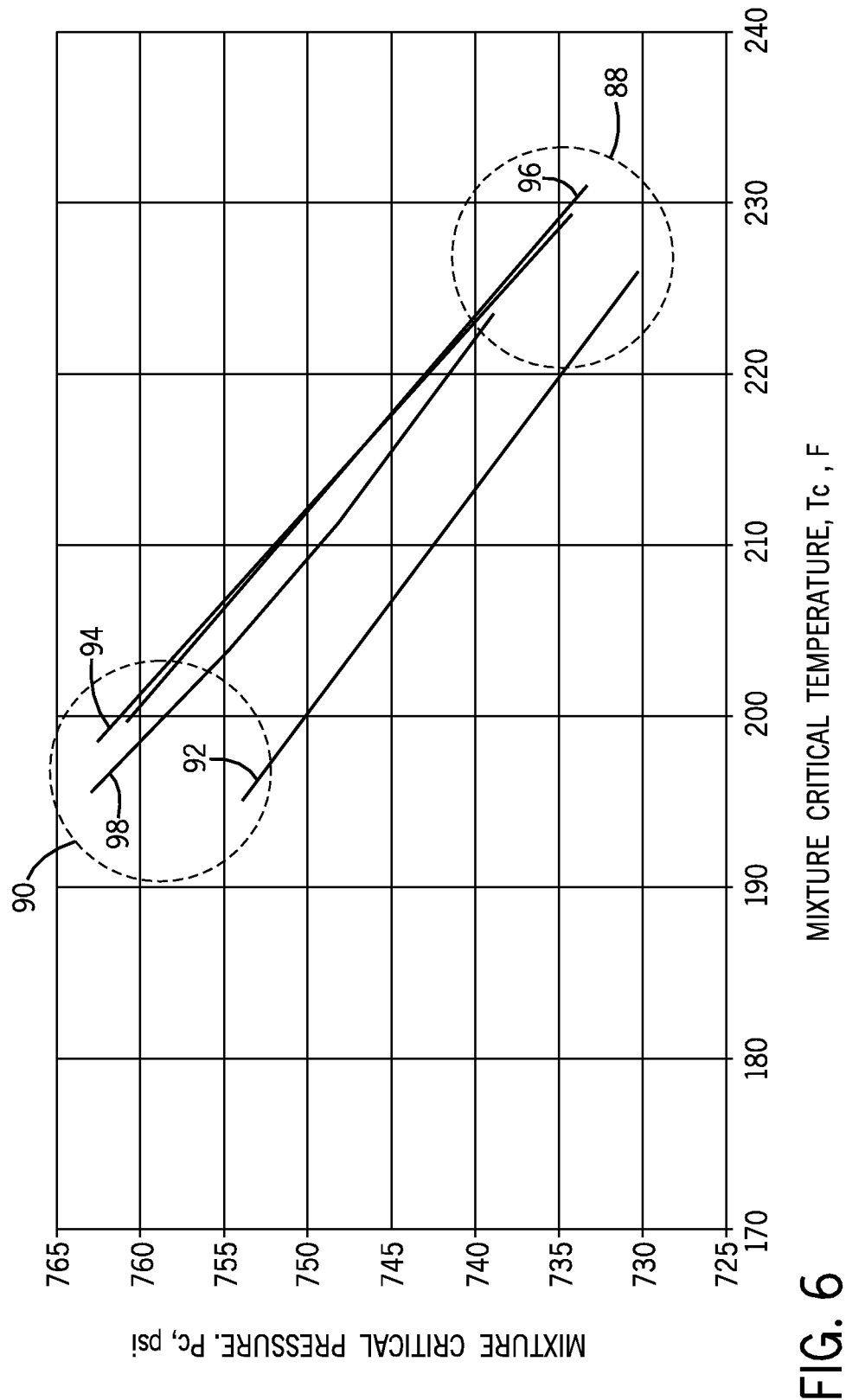
FIG. 6 is a graph showing the effects on the calculated critical points of changing the hexene concentration in or adding hydrogen to a propane/ethylene diluent mixture, in accordance with prophetic examples of the present techniques.

After hexene, hydrogen may have the greatest affect on the critical pressure and temperature. To illustrate the effects of hydrogen, calculations were performed on various mixtures containing propane, ethylene, 1-hexene, and hydrogen. The results obtained from the calculations are shown in the plot in FIG. 6. In this plot, each of the critical point calculations were performed from 0.01 wt. fraction ethylene, indicated by reference number 88, to 0.14 wt. fraction ethylene, indicated by reference number 90. The other components were held constant, with calculations run on systems that contained no hexene or hydrogen (as shown by line 92), 1 wt. % hexene with no hydrogen (as shown by line 94), 2 wt % hexene with no hydrogen (as shown by line 96), and 1 wt % hexene with 1 mol % hydrogen (as shown by line 98). While all of the extra components affected the critical points and critical temperatures obtained from the calculations, all values were below a pressure of about 765 psia and above a temperature of about 195° F. These limits may be used in embodiments of the present techniques for setting the operating limits for the use of semi-supercritical propane. Similar calculations were run for isobutane and showed that semi-supercritical values may occur below a pressure of about 825 psia and above a temperature of about 210° F.

C. The Semi-Supercritical Operating Region

The critical pressures and critical temperatures calculated above may be used to define the semi-supercritical operating regime. This regime may be more clearly illustrated by the plot in FIG. 7. In this plot, the lines calculated for FIG. 6 (indicated by reference numeral 102) are superimposed over a larger pressure and temperature regime. As discussed with reference to FIG. 6, the upper left point on each line referenced by 102 indicates a mixture containing 0.14 wt. fraction ethylene, while the lower right point indicates a mixture containing 0.1 wt. fraction ethylene. The other components are varied as discussed with respect to FIG. 6.

The highest operating temperature that may be practical may be defined by the resin properties, as higher temperatures, e.g., greater than about 195° C., may lead to dissolution of the polymer in the diluent or melting of the polymer product. Either of these effects may cause fouling of the reactor. For this reason, in this example, a practical upper limit on operating temperature for a linear low density polyethylene resin may be around 195° F. This temperature is indicated on the plot by the line labeled 104. As can be seen from the comparison of the calculated results 102 with line 104, this temperature may also be below the critical temperature of the diluent mixtures. Higher ethylene concentrations than 14 wt % are possible in a loop reactor. However, the use of these high concentrations would use a lower reactor temperature than 195° F. to remain in the semi-supercritical region.

In this example, the lowest operating pressure to remain in the semi-supercritical operating regime may be determined from the calculated results 102. As shown by line 106 on the plot, a lower pressure limit of 765 psia may be above the critical pressure of the diluent mixtures. Operating above this pressure decreases the likelihood that two phase flow will occur in the reactor due to vapor formation and provides the other benefits previously discussed. In contrast, operating above both critical points, i.e., in the supercritical region, may be less desirable because the low density polymer may swell or melt and foul the reactor.

Figure 7:
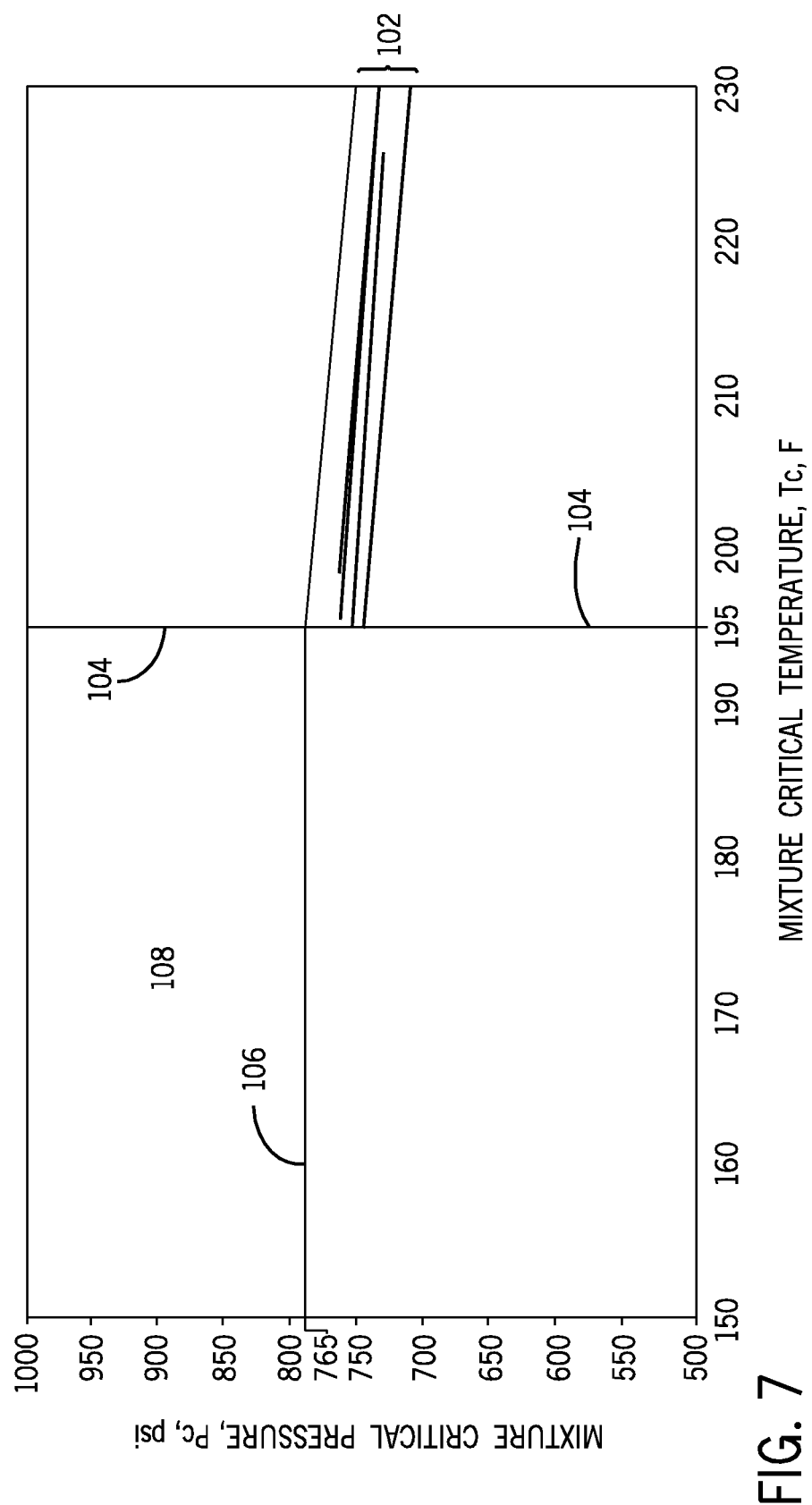
FIG. 7 is a graph showing the calculated semi-super critical, or compressible liquid, region of the phase diagram, for a propane based diluent, in relationship to diluent mixtures of differing compositions, in accordance with prophetic examples of the present techniques.

An exemplary operating regime that may be defined by these temperature and pressure limitations is labeled 108 in FIG. 7. The high pressures needed to operate in this semi-supercritical regime may be above the current operating limits used in many commercial reactors. Further, polyolefin catalysts may function more efficiently at high temperatures, e.g., greater than about 175° C., giving a narrow temperature regime for the reactor. For this reason, large, high-pressure reactors having a precise temperature control (e.g., within plus or minus 10° C. of a target temperature, or within plus or minus 20° C. of a target temperature) may be beneficial for operating in the semi-supercritical regime. Such reactor systems may tend to decrease temperature variations that could be problematic. An exemplary reactor system is discussed in the following section.

III. A Polymerization Reactor System that May Use Semi-Supercritical Diluents

Figure 8:
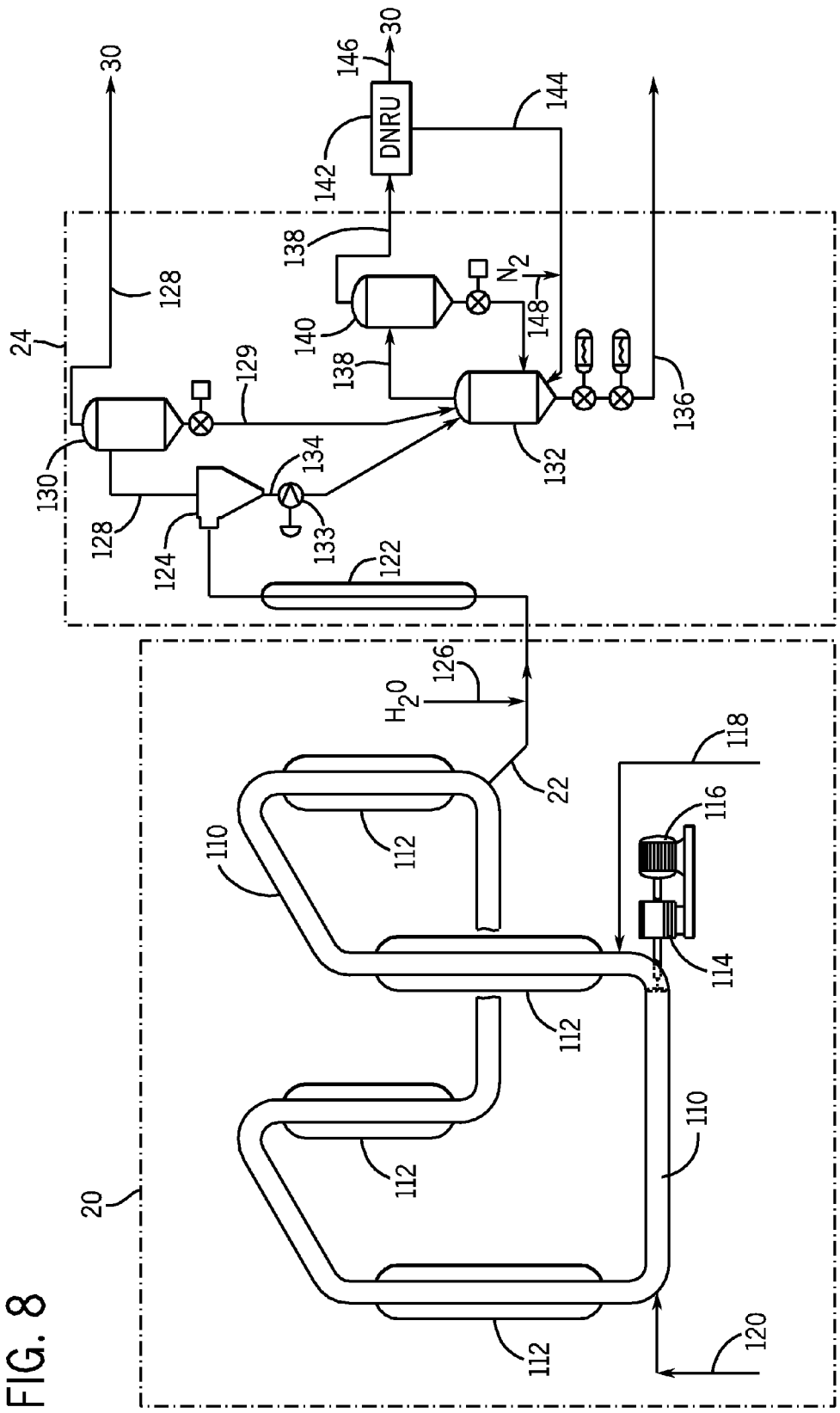
FIG. 8 is a process flow diagram of an exemplary reactor system and a diluent/monomer recovery system of the polyolefin manufacturing system of FIG. 1, in accordance with embodiments of the present techniques.

A process flow diagram of a polymerization reactor system 20 and diluent/monomer recovery system 24 (as discussed with respect to FIG. 1) that may be used in embodiments of the present techniques are depicted in FIG. 8. As discussed above, the reactor system 20 may include one or more polymerization reactors, which may in turn be of the same or different types. Furthermore, in multiple reactor systems, the reactors may be arranged serially or in parallel. Whatever the reactor types making up the reactor system 20, a polyolefin particulate product, generically referred to as "fluff" 28 herein, is produced. Although, the following examples use a single reactor, the present techniques are applicable to more complex reactor arrangements, such as those involving additional reactors, different reactor types, and/or alternative ordering of the reactors or reactor types.

One reactor type includes reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor 110 which produces polyolefin, such as polyethylene, polypropylene, and their copolymers, will be discussed in the context of the present techniques though it is to be understood that the present techniques are similarly applicable to other types of liquid phase reactors.

Referring to FIG. 8, the loop slurry reactor 110 is generally composed of segments of pipe connected by smooth bends or elbows. An exemplary reactor 110 configuration includes twelve jacketed vertical pipe legs, approximately 24 inches in diameter and approximately 200 feet in length, connected by pipe elbows at the top and bottom of the legs. As discussed below, reactor jackets 112 are normally provided to remove heat from the exothermic polymerization via circulation of a cooling medium, such as treated water, through the reactor jackets 112. Larger diameter reactors would be acceptable but would have less heat transfer area per unit volume of the reactor. Further, smaller diameter reactors, e.g., less than about 20 inches, would have more relative heat transfer area, but may use a longer reactor and more reactor circulation pump differential pressure to circulate the reactor contents.

The reactor 110 may be used to carry out polyolefin polymerization under slurry conditions in which insoluble particles of polyolefin are formed in a fluid medium and are suspended as slurry until removed. A motive device, such as pump 114, circulates the fluid slurry in the reactor 110. An example of a pump 114 is an in-line axial flow pump with the pump impeller disposed within the interior of the reactor 110 to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 116 or other motive force. In a large reactor 110, e.g., greater than about 50,000 gallon, more than one impeller may be used to drive the circulation. These impellers may be located on opposite sides of the reactor 110 and use separate motors 116. In other embodiments, the impellers may be attached to a single shaft driven by a single, larger motor 116. In either case, the lower density that may be present with certain diluents in the semi-supercritical phase, such as propane, may lower the power requirements for circulation at the same circulation velocity, for example, by about 5-40%, depending on whether a single motor replaces a two motor configuration.

The liquid phase of the polymer slurry circulating within the reactor 110 may be considered the diluent mixture and may include olefin monomers and comonomers, diluent, co-catalysts (e.g., alkyls, triethylboron, methyl aluminoxane, tri-isobutyl aluminum, tri-ethyl aluminum etc.), molecular weight control agents (e.g., hydrogen), and any other desired co-reactants or additives. Such olefin monomers and comonomers are generally 1-olefins (i.e., having a double bond between the first two carbons) having up to 10 carbon atoms per molecule and may have no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-pentane, i-pentane, neopentane, n-hexane, cyclohexane, cyclopentane, methylcyclopentane, ethylcyclohexane, isooctane and the like. Most of these diluents may be capable of running in a semi-supercritical state at practical temperatures and pressures. Further, the diluents may be combined to achieve precise temperature and pressure control over the semi-supercritical operating regime for a particular catalyst and target polymer system, for example, by forming a blend of propane with a small amount of isobutane to adjust the semi-supercritical operating regime.

These components are added to the reactor interior via inlets or conduits at specified locations, such as depicted at feed stream 118, which generally corresponds to one of the feed streams 18 of FIG. 1. Likewise, a catalyst, such as those previously discussed, may be added to the reactor 110 via a conduit at a suitable location, such as depicted at feed stream 120, which may include a diluent carrier and which also generally corresponds to one of the feed streams 18 of FIG. 1. In total, the added components generally compose a fluid medium within the reactor 110 in which the catalyst includes suspended particles.

The reaction conditions, such as temperature, pressure, and reactant concentrations, may be regulated to facilitate the desired properties and production rate of the polyolefin in the reactor 110, to control stability of the reactor 110, and the like. Temperature may be maintained below that level at which the polymer product would melt or go into solution. As discussed above, the practical limit, based on solubility of a linear low density polyethylene in propane may be less than about 200° F., although, if other polymer systems are used with a diluent mixture having a higher critical temperature, this temperature may be higher, for example, around 215° F. for isobutane. As indicated, due to the exothermic nature of the polymerization reaction, a cooling fluid may be circulated through jackets 112 around portions of the loop slurry reactor 110 to remove excess heat, thereby maintaining the temperature within the desired range, generally between 150° F. to 195° F. (65° C. to 91° C.). The operating temperature range may be kept within this narrow window to avoid problems with fouling, as discussed above. In contrast, the typical range for the difference in temperature between the incoming coolant and the outgoing coolant flowing through a jacket on the reactor ($\Delta T$) in a polyolefin reactor may be about 20° F. or higher. While this range may be sufficient, an even narrower range may be utilized for the semi-supercritical diluents of the present techniques, e.g., 5 to 10° F. This may allow less of a temperature swing in the slurry as it flows around the reactor. Such a narrow range may be more easily achieved by the use of large reactors, which may have a large length to diameter ratio for the jacketed portion, thus increasing the internal surface area of the reactor. For example, in an embodiment of the present techniques, the reactor system may be 70,000 to 100,000 gal in size. In other embodiments, a smaller reactor may be used with a corresponding increase in the flow of coolant through the jackets 112 to remove excess heat.

Moreover, pressure in the reactor may be regulated to maintain the diluent or diluent mixture above its critical pressure. For propane as the diluent, an exemplary operating range extending critical pressure would be at least about 751 psia, and may be within a range of about 800-900 psia. The high pressure values for the semi-supercritical regime may benefit from reactors that have relatively high pressure ratings. For example, to operate in the semi-supercritical regime, a reactor and the immediate attached support lines, including feed and takeoff lines, may be class 600 or class 900 piping to withstand the higher pressures.

As the polymerization reaction proceeds within the reactor 110, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from the reactor 110 via a settling leg or other means, such as a continuous take-off, as depicted discharge stream 22. In downstream processing, the polyethylene discharged from the reactor may be extracted from the slurry and purified.

IV. Diluent/Monomer Recovery System

A. Separation Vessel

The discharge 22 from the reactor 110 may be sent to the diluent/monomer recovery system 24. In the diluent/monomer recover system 24, the discharge 22 from the reactor 110 may flow through an in-line flash heater 122 and into a separation vessel 124. The in-line flash heater 122 may be a jacketed conduit that uses steam or steam condensate in an outer jacket, for example, as a heating medium to provide indirect heating to the discharge 22. In embodiments, multiple parallel in-line heaters may be used to increase flow and decrease the risk of plugging. Thus, the loop slurry reactor 110 effluent (discharge 22) is heated prior to its introduction into the separation vessel 124. Also, before the discharge 22 enters the separation vessel 124, water or other catalyst poisons 126 may be injected into the discharge 22 as kill agents to deactivate any residual catalysts and co-catalysts in the discharge 22 stream. Because these injected components are catalysts poisons by definition, they may be completely removed, or at least substantially removed, from any recovered material (e.g., monomer or diluent) recycled to the reactor 110.

In other embodiments, kill agents may be injected into the reactor 110 in quantities that may be sufficient to partially deactivate the catalyst in the reactor 110 and thus slow the production rate of polymer. Such a partial deactivation, moderation, mini-kill may be useful to match production rates between a reactor and a finishing line if the finishing line is undergoing service, for example, during the changing of screen pack or a filter, among others. While the reactor production is slowed, the solids storage capacity of the separation vessel 124, or other downstream units, may be sufficient to store polymer produced until the finishing line can be returned to full production.

In the separation vessel 124, most of the non-solid components of the reactor discharge 22 are withdrawn overhead as vapor in the flash gas 128. In an embodiment of the present techniques, the separation vessel 124 may be a cyclonic separator. In other embodiments, the separation vessel 124 may be merely an open vessel. In polyethylene production, this vapor may be primarily the diluent, such as propane, isobutane or other diluents previously mentioned. It may also contain most of the unreacted monomer (e.g., ethylene) and other light components, as well as unreacted comonomer (e.g., 1-hexene, butene, 1-pentene, 1-octene, and 1-decene) and other heavy components (e.g., hexane and oligomers). In general light components or "lights" may be defined as those light components with lower boiling points than the diluent employed. In contrast, heavy components or "heavies" may be defined as those components having higher boiling points than the diluent. An exemplary approximate composition of the flash gas 128 may be 84 wt. % propane, 5 wt. % ethylene, and 11 wt. % other components (e.g., comonomer). A level or volume of fluff may be maintained in the separation vessel 124 to give additional residence time of the fluff in the chamber 124 to facilitate separation of liquid and vapor entrained in the porous fluff particles.

The flash gas 128 may be processed in equipment such as a bag filter 130, or other types of equipment including cyclones, etc., to remove entrained fluff solids 129 for return to the separation vessel 124 or to downstream equipment, such as the purge column discussed below. The flash gas 128 may also travel through other processing units, such as a deoxygenation bed, for example. Furthermore, the flash gas 128 may be cooled or condensed in a heat exchanger (e.g., shell-and-tube construction) prior to being recycled to the feed system 16 or fractionation system 30 (as discussed with respect to FIG. 1). To reduce steam consumption in the fractionation system 30, the flash gas 128 may bypass the fractionation system 30 and return more directly to the reactor 110 via the feed system 16 (not shown).

The solids (polymer) in the separation vessel 124 are withdrawn with a small amount of entrained diluent (and monomer) and sent to a purge column 132 via solids discharge 134. The solids discharge 134 conduit may include valve configurations that allow polymer to flow downward through the conduit while reducing the potential for vapor to flow between the separation vessel 124 and the purge column 132. For example, one or more rotary or cycling valves 133 may be disposed on the solids discharge 134 conduit. In other configurations, the discharge to the purge column 132 may include appropriate valve configurations, a surge chamber, or simply a conduit, and so on. Note that certain embodiments provide for a continuous fluff discharge from the flash chamber, which eliminates one or more relatively large cycling valves and the associated energy consumption. Such techniques are discussed in U.S. Publication 2006/0287442, herein included by reference in its entirety.

B. Purge Column

The primary solids feed to the purge column 132 is typically the solids discharge 134 (polyolefin fluff) that exits the separation vessel 124. A purpose of the purge column 132 is to remove residual hydrocarbon from the entering solids streams and to provide substantially-clean polymer fluff 136. The fluff 136 may be transported or conveyed to the extrusion/loadout system 36 for conversion to pellets 38 (as discussed with respect to FIG. 1), and for distribution and sale as polyolefin pellet resin to customers 40. In general, the treated polymer particles discharged from purge column 132 as polymer fluff 136 may be processed in a conventional finishing operation, such as a screw extruder, in the extrusion/load out system 36.

In the exemplary purge column system illustrated, nitrogen may be injected to the purge column 132 to remove residual hydrocarbons via overhead discharge 138. This discharge 138 may be sent through a bag filter 140 for the separation of entrained fines, which may be returned to the purge column 138. In other embodiments, the bag filter 140 may be replaced with other types of process units, such as, for example, a cyclonic separator, or may be eliminated altogether. After the bag filter 140, the discharge 138 may be sent through a separation unit 142, such as a membrane recovery unit, pressure swing adsorption unit, refrigeration unit, and so forth, to recover nitrogen via nitrogen stream 144, and to discharge a separated hydrocarbon stream 146 as feed to the fractionation system 30. The separation unit 142 may be known as a Diluent Nitrogen Recovery Unit (DNRU). Moreover, fresh nitrogen 148 may be added to the nitrogen circuit to account for nitrogen losses in the purge column 132 system. The hydrocarbon stream 146 discharging from the separation unit 142 makes available hydrocarbon feed that may be processed to give the olefin-free diluent used in catalyst preparation.

C. Alternate Configurations

A variety of configurations may be employed in the diluent/monomer recovery system 24. For example, the solids discharge 134 from the separation vessel 124 may be sent to another reactor (e.g., a gas phase reactor) instead of to the purge column 132. If discharged to another reactor, catalyst poison 126 may not be injected upstream in the discharge 22, and, thus, residual active catalysts may remain for further polymerization.

In another configuration, the purge column 132 may be used as an extruder feed tank in the extrusion/loadout system 36 (discussed with respect to FIG. 1). The bag filter 140 and separation unit 142 associated with the purge column 132 may be relocated to the extrusion/loadout system 36 to accommodate this use. Thus, the high process pressure in the separation vessel 124 may be utilized to convey the fluff particles in solids discharge 134 to the extrusion/loadout system 36, eliminating a blower system (and associated electrical consumption) traditionally used to convey the fluff 136 to the extrusion/loadout system. Furthermore, heat in the fluff particles may be retained as the particles are not subjected to the typical cooling effect of nitrogen in a conventional blower conveying loop. Thus, less heating of the fluff particles may be used in the downstream extruder feed system. Finally, the process pressure in the separation vessel 124 may be used to transport the fluff particles in a dense phase conveying arrangement, thus lowering the velocity of the flowing particles and reducing transport damage to the particles.

V. Reactor Cooling

To facilitate the use of a semi-supercritical diluent for the production of, for example, linear low density polyethylene, the cooling system may be designed to decrease the temperature differential ($\Delta T$) between the inlets (entering cooling medium) and outlets (exiting cooling medium) of the reactor jacket, to about 10 to 20° F. or to about 5 to 10° F. This would be beneficial as the operational temperature range that may be used to keep the diluent in the semi-supercritical phase while not exceeding the melt temperature of the polymer is very narrow. For example, employment of a large reactor may result in a high heat-transfer surface area for the reactor jacket (e.g., due to a high length/diameter (l/d) ratio of the reactor), which may aid in lowering the $\Delta T$. Further modifications may be beneficial in the reactor cooling system to decrease the temperature differential between the coolant inlet and outlet. For example, a higher velocity coolant system (e.g., 20-30 feet per second versus the more traditional 10 feet per second) may increase heat removed from the reactor. In other words, the increased velocity of the cooling medium may increase the heat-transfer across the reactor jacket and, thus, help to maintain a more constant temperature in the reactor.

The increased velocity of the cooling medium may be accomplished by selecting a larger reactor coolant water pump, or by decreasing the cross-sectional area of the reactor jacket perpendicular to the flow of cooling medium, for example. In certain embodiments, a larger reactor size (and associated increase in heat-transfer area of the reactor jacket) may be sufficient to achieve the accomplished lower temperature differential and more constant reactor temperature. Such a reduction in temperature differential may be accomplished even with increasing the cooling pump size, for example (which may reduce unit electrical consumption of the reactor system).

A. Loop Slurry Reactor

Figure 9:
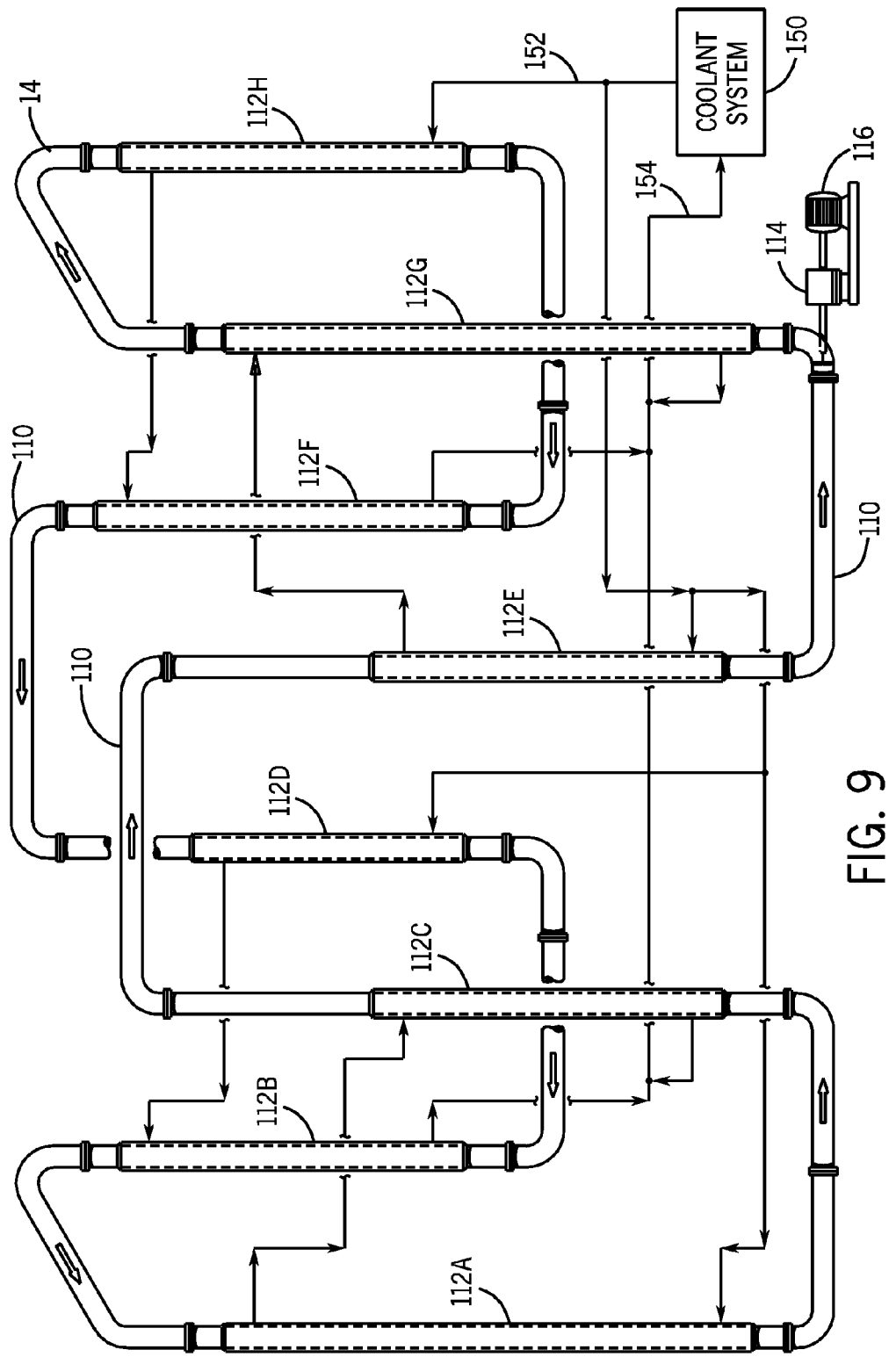
FIG. 9 is a diagrammatical representation of the exemplary polymerization reactor of FIG. 8 showing the flow of cooling medium through the reactor jackets, in accordance with embodiments of the present techniques.

FIG. 9 depicts an example of a polymerization reactor 110 that may be used in the system shown in FIG. 8. This figure shows a counter-current flow scheme of cooling medium through the reactor jackets 112A-H. Again, the loop reactor 110 is generally composed of segments of pipe connected by smooth bends or elbows. A motive device, such as pump 114, circulates the fluid slurry in the reactor 110. An example of a pump 114 is an in-line axial flow pump with the pump impeller disposed within the interior of the reactor 110. A coolant system 150 removes heat from the loop reactor 110 via reactor jackets 112A-H. The coolant system 150 provides a coolant supply 152 (e.g., treated water) and processes a coolant return 154.

As the polymerization reaction proceeds within the reactor 110, the reaction conditions may be controlled to facilitate the desired degree of polymerization and the desired reaction speed while keeping the temperature below that at which the polymer product would fuse or dissolve. As mentioned, due to the exothermic nature of the polymerization reaction, cooling jackets 112A-H may be provided around portions of the closed loop system through which a cooling fluid is circulated as needed to remove excess heat (heat of reaction), thereby maintaining the temperature within the desired range, generally between about 165° F. to 195° F., such as about 175° F. to 190° F. in embodiments of the present techniques.

In general, reactor temperature varies linearly with changes in the reactor system operating conditions. For example, the heat generated in the reactor by the exothermic polymerization may be linear with the polyolefin production rate (i.e., pounds per hour of polyolefin polymerized). Thus, reactor temperature, which is an indication of the energy or heat in the reactor, varies linearly with production rate. Typical reactor temperature control may involve a proportional-integral-derivative (PID) algorithm. Other advanced control techniques may be used in place of, or in addition to the PID algorithm.

B. Reactor Coolant System

Figure 10:
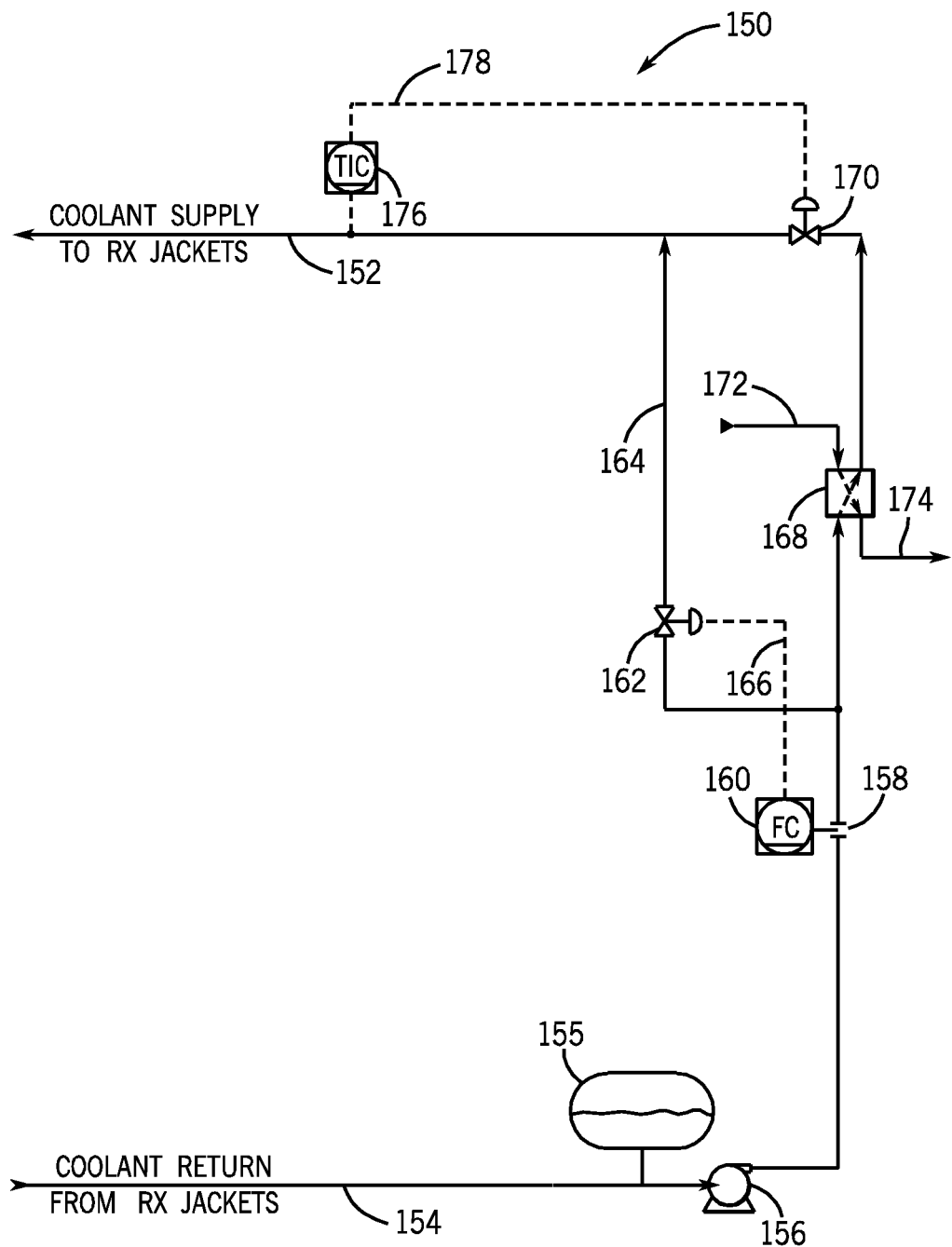
FIG. 10 is a process flow diagram of an exemplary coolant system used in the temperature control of the polymerization reactor of FIG. 9, in accordance with embodiments of the present techniques.

A process flow diagram of a coolant system 150 for the loop slurry reactor 110 of FIG. 9 is depicted in FIG. 10. The coolant system 150 provides a coolant supply 152 to reactor jackets 112A-H. The coolant system 150 receives a coolant return 154 from reactor jackets 112A-H. A variety of coolants may be used to remove or add heat to the reactor system. In this illustrative embodiment, steam condensate (demineralized water) is used as the coolant. The coolant return 154 "carries" the heat removed from the reactor. The coolant system 150 transfers this heat to a utility cooling medium, such as to cooling tower water or sea water. The coolant system delivers "cooled" coolant supply 152 to the reactor jackets. In embodiments, the coolant supply 152 temperatures may range from 105° F. to 150° F. or from 165° F. to 185° F. or from 105° F. to 185° F. Typical coolant return 154 temperatures may range from 160° F. to 180° F. or from 175° F. to 195° F. or from 160° F. to 195° F.

Coolant flow through the coolant system 150 and through the reactor jackets 112A-H may be circulated, for example, by a centrifugal pump, as illustrated by coolant pump 156. An exemplary design basis of a coolant pump 156 is approximately 50 to 60 pounds per square inch (psig) delivered differential pressure at 5 to 30 million pounds per hour of coolant. The coolant rate may set the maximum coolant temperature rise, e.g., about 10° F. or about 20° F. An example configuration of the reactor jackets 112A-H (FIG. 8) is two counter-current double-pipe exchangers operated in parallel, with the inner pipe (the reactor) having an approximate 22 inch internal diameter, and the outer pipe (the jacket) having an approximate 28 inch internal diameter. In this example, the total heat transfer area of the reactor jackets 112A-H over eight legs is about 5,000 square feet. In another embodiment of the present techniques, the reactor may have twelve legs and, at the same internal diameter of 22 inches, a surface area of about 7,500 square feet. Larger reactors may provide more surface area, for example, a 70,000 gallon reactor may provide 15,000 square feet of cooling area.

The coolant circulation may be a closed loop, hydraulically full system. A surge drum 155 may be employed in the coolant circuit (i.e., at or near the suction of pump 156) to maintain the circuit liquid full and to reduce swings in pressure of the coolant system by compensating for hydraulic expansion caused by coolant temperature swings. Thus, pressure may be maintained substantially constant at the pump 156 suction by controlling level and pressure of the surge drum 155.

The total coolant circulation flow rate through the coolant system and the reactor jackets may be maintained at a constant rate and may be measured at flow element 158. The flow element 158 may represent, for example, a flow orifice plate installed in the coolant piping. A control system may calculate the circulation flow rate based on the orifice size and the measured upstream and downstream pressures. The flow rate indication from flow element 158 may be received by flow controller 160, which may be a control block in a distributed control system (DCS). For example, a distributed control system that may be used to control a reactor is the Honeywell TDC-3000 control system. To maintain total constant flow, the output of flow controller 160, using control signal 166, may adjust the position of the valve 162 on a flow bypass line 164. Normally, it is desirable to minimize the movement of the position of valve 162 to prevent cycling in the coolant pump 156. Thus, additional means at other points in the system may assist in maintaining the total coolant circulation flow rate constant.

During normal operation of a loop slurry reactor 110, heat is removed from the reactor contents, and heat is exchanged in cooler 168, which may represent one or more coolers. Heat is removed from the coolant in cooler 168 to cool the coolant supply 152 to the reactor jackets 112A-H. The cooler 168 may be, for example, a shell and tube heat exchanger or a plate and frame heat exchanger. A cooling medium, such as cooling tower water or sea water, flows through the cooler opposite the coolant, removing heat through the heat transfer surface area but not commingling with the coolant. The cooling medium flow is represented in this example by cooling water supply 172 and cooling water return 174. A cooling tower (not shown) may process the circulating cooling medium by removing heat from the cooling water return 174 and providing cooled cooling water supply 172. Thus, the cooling tower water removes heat from the coolant, which in turn removes heat from the reactor 110. In one example, the cooler 168 represents six plate and frame exchanger coolers that operate in parallel, each plate and frame exchanger cooler having approximately 200 stainless steel (304) plates and approximately 1600 square feet of heat transfer surface, with the heat transfer coefficient varying from about 100 to over 300 Btu/hr/sq. ft/° F. as a function of coolant flow rate and slurry flow rate and other variables. The heat removed from the reactor may be about 15.5 million Btu per hour per cooler, assuming a design pressure drop of approximately 3 psig on the coolant side. For the temperature control, coolant controller 176 (coolant temperature controller) maintains the temperature of the coolant supply to the reactor jacket. Coolant controller 176 sends an output signal 178 to adjust the positions of valve 170 (and potentially other valves).

VI. The Loop Reactor Pump

The present techniques provide for use of guide vanes in the loop reactor pump that circulates the contents of the reactor. The addition of guide vanes may improve pump efficiency, reduces electrical consumption, and decreases normalized electrical usage by increasing polyolefin production rate over pumps lacking guide vanes. Further improvements in efficiency over pumps with guide vanes may be obtained by using mixed flow pumps, as discussed in the sections that follow.

A. Guide Vanes

In addition to improved pump efficiency, implementation of the guide vanes may improve several performance characteristics of the loop reactor and loop reactor pump in comparison to pumps without guide vanes. For example, pumps that utilize guide vanes may have head pressures ranging from 5 to 25% higher than pumps without guide vanes. As discussed below, pumps with guide vanes may provide high circulation rates, high pump differential pressure, and high expected solids operating capability in the loop reactor, among others. These pump characteristics may allow for high production rates of polyolefin polymers from large reactors. In the case of a 70,000 gallon, 24-inch outer diameter (OD) loop reactor, use of guide vanes in the reactor pump may provide for polyolefin production in the range of 1.0 to 1.2 billion pounds of polyolefin per year. Guide vanes may be employed in new installations or in the retrofit of existing loop reactor pumps to increase pump head and slurry velocity, which may facilitate a higher solids level (e.g., greater than about 45%).

Guide vanes may be utilized, for example, on loop pumps having a nominal OD in the range of 20 inches to 32 inches. Such pumps may have 240-300 feet of head at 35,000-40,000 gallons per minute (gpm) with a pumping efficiency improvement in the range of 1-4% over pumps without guide vanes. The guide vanes allow for a larger reactor, e.g., 55,000 gallons or greater, having the same circulation rate as a smaller reactor, e.g., 35,000 gallons or less. For example, a 30 inch pump having guide vanes may provide adequate circulation in a 45,000-55,000 gallon reactor, while a 30 inch pump without guide vanes may not provide adequate circulation. Other configurations that may be used in the reactors of the present techniques may include larger (e.g., 40 inches or greater) pump diameters or use of two reactor pumps, and so forth.

In general, three to six guide vanes may be employed, each vane having a relative vane angle in the range of 0 to 30 degrees. The relative vane angle is the angle of the guide vane relative to the leading edge angle of the pump propeller. In other words, the relative vane angle is the difference in the average of the angle of the guide vane exit and lead angle of the pump blade relative to the plane of propeller rotation. A larger positive number of the relative vane angle generally means that the reactor slurry is rotated less by the pre-swirl guide vanes, while a smaller or negative number generally means that the slurry is rotated more. The direction of pre-swirl rotation of the slurry is in the opposite direction of the pump propeller rotation.

A typical guide vane may be welded to the wall of the reactor pipe upstream of the pump propeller. Placement of the guide vanes may be from 0.1 to 2 pipe diameters upstream of the pump propeller. The guide vanes may be positioned clear of the propeller hub and upstream of the reactor flange that connects to the pump suction. In this case, disassembly of the pump suction pipe may be facilitated where the guide vanes do not extend downstream of the flange.

In one example, the guide vanes start at about 24 inches in length, 6-7 inches tall, and 0.6-0.9 inches thick. The guide vanes may curved and bent so that the guide vanes are substantially parallel to the direction of flow and the discharge end is at the desired relative angle while following along the inside of the suction pipe of the pump. The upstream edge of the guide vanes may be sloped so that if debris or large polymer fragments (e.g., polymer "rope" or "strings") catches on the upstream edge, the debris or fragments may tend to advantageously slide to the center of the pipe and then be free of the guide vanes.

B. Reactor Pump Improvements

Loop reactors are often scaled up in size at a constant diameter to maintain a relatively constant heat transfer area to volume ratio. For large loop reactors, e.g., 55,000 gallon or larger, the length of the flow loop and the pressure drop of the slurry flowing around the loop may be significant, which may lead to settling of the suspended polymer and catalyst particles. To facilitate suspension of particles in the diluent, several techniques may be used to provide sufficient reactor pump capacity. Such techniques may include, the use of multiple axial flow pumps, pumps having guide valves, pumps utilizing large diameter propellers (e.g., 24 inches or greater), low clearance between the propeller and the reactor wall (e.g., 0.125 in or less), or high rotational velocity pumps (e.g., greater than about 200 RPM). These techniques may be used singly or in any combination to improve the flow in the reactor.

Further improvements in pumping efficiency may be achieved by the use of a mixed flow pump. A mixed flow pump may have characteristics of both an axial flow pump (e.g., having the slurry flow through the propeller and into the pump elbow) and a radial flow pump (e.g., where the pumped fluid or slurry enters the eye of the pump and leaves at the outer radius of the pump, for example, 90 degrees out of the plain of the incoming stream). In a mixed flow pump the slurry stream may exit the propeller with an angle deflected from the inlet flow direction towards the outer radius of the pump, although generally not at the typical 90 degrees of a radial flow pump. The pump case after the propeller/impeller then converts the flow back to the axial direction and then around an elbow. Compared to a pump utilizing guide vanes alone, the mixed flow pump may provide more pump head and facilitate the construction of longer and thus larger loop reactors (e.g., increasing reactor size from about 55,000 gallons to greater than about 70,000 gallons). Further, the flow rate of a mixed flow pump may be lower than pumps having only guide vanes, which may decrease stress on the polymer fluff and generate less fines in the reactor. Mixed flow pumps or guide vanes may allow for greater efficiency and lower energy consumption.

VII. Continuous Take Off of the Reactor Effluent Discharge

FIGS. 11-13 illustrate a continuous take-off mechanism of the reactor discharge 22. Referring to FIG. 11, a continuous takeoff mechanism 180 disposed on a pipe elbow of the loop slurry reactor 110, is depicted. The continuous takeoff mechanism 180 includes a take-off cylinder 182, a slurry withdrawal line 184, an emergency shut-off valve 185, proportional motor valve 186 to regulate flow, and a flush line 187. For example, where diluent input is held substantially constant, and proportional motor valve 186 may be used to control the rate of continuous withdrawal which may maintain the total reactor pressure within designated set points.

Referring to FIG. 12, which illustrates a cross-section taken along section line 11-11 of FIG. 11, a smooth-curved pipe elbow having the continuous take-off mechanism 180, is depicted. Thus the illustrated pipe elbow may be considered an appendage-carrying elbow. As shown, the mechanism includes take-off cylinder 182 which is attached, in this instance, at a right angle to a tangent to the outer surface of the elbow. Further, coupling to the cylinder 182 is the slurry withdrawal line 184. Disposed within the take off cylinder 182 is a ram valve 188, which may serve at least two purposes. First, it may provide a clean-out mechanism for the take-off cylinder if it should ever become fouled with polymer, for example. Second, it may serve as a shut-off valve for the entire continuous take-off assembly.

The take-off cylinder 182 may be affixed tangentially to the curvature of the elbow, just prior to the slurry flow turning upward as illustrated in FIG. 13. The opening may be elliptical to the inside surface, for example, and further enlargement may be implemented to improve solids take-off. A variety of orientations of the attachment of the take-off cylinder 182 may be implemented. For example, the take-off nozzle may be located 45 degrees around the outside of the elbow as shown in FIG. 12. The angle around the outside of the elbow may be from 0 to 90 degrees from the lowest point of the down stream elbow of the two elbows that connect a pair of legs.

Modeling calculations indicate that an improved location may be located between about 20 and 70 degrees around this elbow. Further, the nozzle may be oriented from 0 to 90 degrees from the perpendicular to a tangent line drawn on the outside of the elbow. By comparison, FIGS. 11 and 12 illustrate 90 degrees orientation, and FIG. 13 illustrates 0 degrees. The orientation direction is in the direction of flow as shown in FIG. 11. Orientations that are out of the bend in the loop are possible but may be less efficient. The take off nozzle may also extend slightly into the flow, with the end either cut off perpendicularly or at an angle. If the nozzle is cut off at an angle, it is inserted so that the nozzle would be flush with the reactor wall at the outside radius. For example, the nozzle may be cut off at a 45 degree angle with the shorter side of the nozzle flush with the elbow wall and the longer side sticking into the flow in the reactor.

A continuous take-off of a product slurry of an olefin polymerization reaction carried out a loop reactor allows operation of the reactor at a higher average solids concentration than with the conventional settling leg(s) used to intermittently discharge polymer fluff from a reactor. For example, production of predominantly ethylene polymers (polyethylene) in isobutane diluent has generally been limited to a maximum solids concentration in the reactor of about 40-45 weight percent (wt. %) with the settling leg configuration. However, the continuous take-off (CTO) has been found to allow significant increases in average reactor solids concentration. As a result, solids concentration of greater than 50 wt. % in the reactor may be implemented with the continuous takeoff. It should be emphasized that in a commercial operation, as little as a one percentage point increase in solids concentration is of major significance. Such an increase, for example, allows higher production rates of polyethylene, and thus generally gives increased normalized energy efficiency.

Furthermore, less liquid in the reactor discharge 22 may place less of a load on downstream recovery and fractionation systems 22 and 24, and thus reduce downstream energy consumption. Additionally, this technique may present savings in electrical consumption because the continuous take-off discharge removes more fines from the reactor than the conventional discharge. With less surface area of particles in the reactor, the fluid mixture may operate at a lower viscosity (e.g., as much as 10% lower), providing for easier circulation of the mixture through the reactor, and thus, less demanding pumping and associated horsepower requirements (e.g., as much as 10% lower).

The solids concentration in embodiments of the present techniques may be increased over reactions using isobutane diluents through the use of semi-supercritical propane as a diluent, for example, by 5-10%. Both the lower solubility of the polyolefin in propane versus isobutane, discussed previously, or other diluents and the lower density of propane versus isobutane, discussed previously, may contribute to this improvement. The decreased solubility may allow for a further increase in the polyolefin solids without increasing reactor fouling from dissolved polymer. For examples, embodiments of the present techniques may allow solids concentration of about 55 wt. %, or higher, to be used. Further, the decreased density of propane versus isobutane may lower the energy used to keep solids suspended while circulating the reactor.

Increasing the solids carrying capacity of the reactor also increases the capability to operate the reactor at higher space-time yield (e.g., a desired 2.6 or greater) as measured in pounds of polymer product produced per hour for each gallon of reactor volume or equivalent measures. Such an increase in the space-time yield in conjunction with a reduced incidence of reactor fouls may result in increased polyolefin production and throughput at the reactor 10.

VIII. Extrusion/Loadout System

Figure 14:
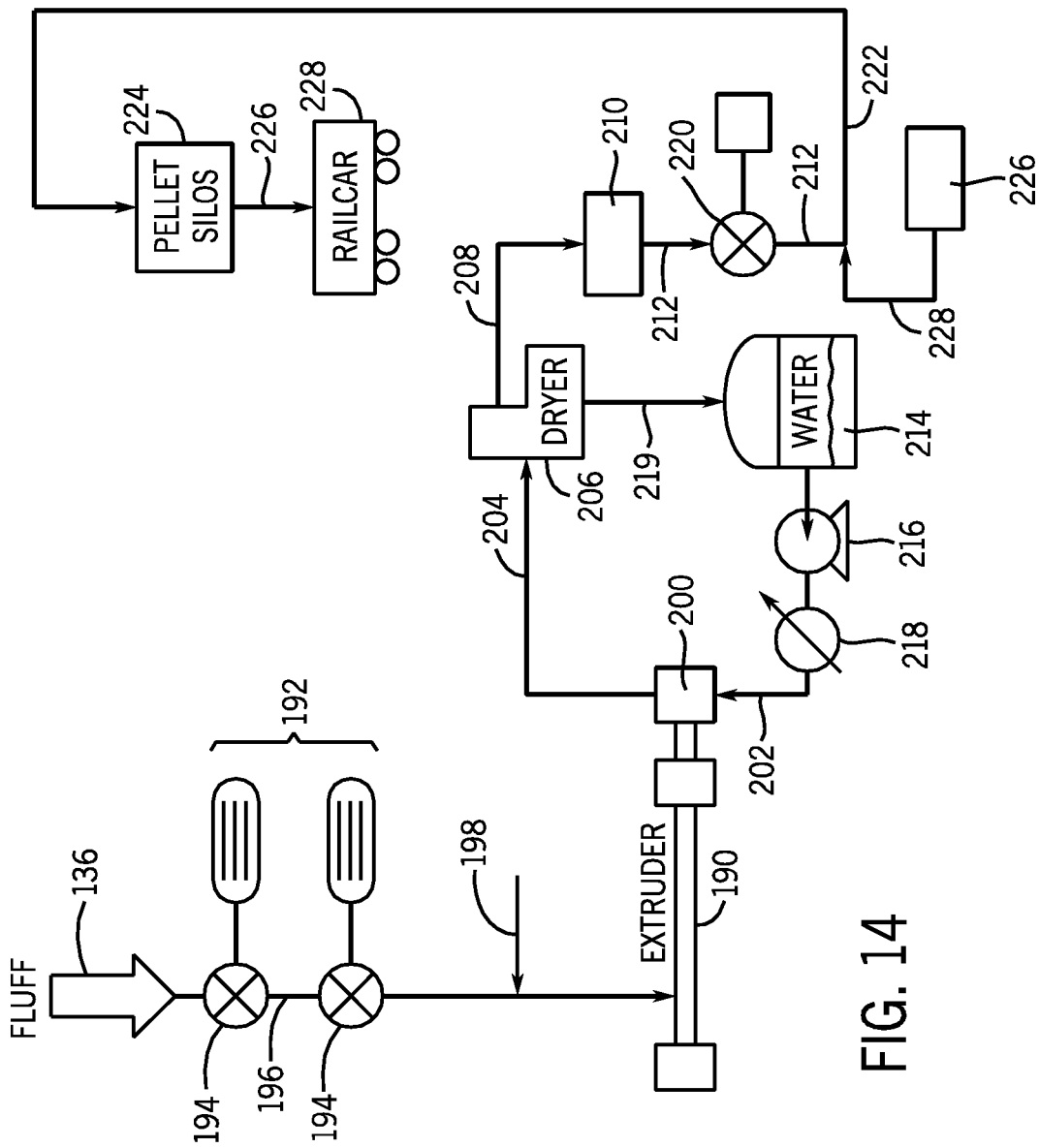
FIG. 14 is a process flow diagram of the extrusion/loadout system of FIG. 1, in accordance with embodiments of the present techniques.

Referring to FIG. 14, a process flow diagram of the extrusion/loadout system 36 of FIG. 1 is depicted. In this embodiment, polyolefin fluff 136 from the purge column 132 of FIG. 8 may be directly transferred, for example, using a dilute phase blower, to the extruder for processing. However, as the upstream purge column 132 may also function as the extruder feed tank, the conveying system for transporting fluff 136, and thus the associated electrical consumption of the blower in the conveying system, may be eliminated, as discussed with respect to FIG. 8 above. Furthermore, in this configuration, the fluff 136 may be warmer (e.g., 150° F. to 180° F.) than if run through the cooling effect (e.g., cooled down to 80-100° F.) of nitrogen or air in a conveying system. The use of hot fluff 136 may lower the energy used by the extruder 190 to heat and melt the incoming fluff 136. Specifically, higher fluff temperature may increase the final melt temperature for fixed speed extruders from the constant energy input The purge column 132 may be isolated from the extruder 190 by a lock hopper 192 configured to prevent vapor from flowing from the purge column 132 to the extruder 190. The lock hopper 192 may be configured using a number of devices, such as motor valves, rotary valves, storage space, and the like. In the embodiment shown in FIG. 14, the lock hopper 192 may be made from two rotary valves 194 enclosing a section 196 of the vertical line connecting the purge column 132 to the extruder 190. The rotary valves 194 may feed polyolefin fluff 136 to the extruder 190, where the extruder heats, melts, and pressurizes the polyolefin fluff 136. The fluff 136 from the purge column 132 may be metered to the extruder 190 with a variety of meters, such as smart flowmeter-type, master-feeder type, and so forth.

Furthermore, additives 198 may be injected into the fluff 136 stream at an addition rate which may be based on a specified ratio to the mass flow rate of the fluff 136. This ratio or "slave" feed of additives 198 to fluff 136 may be specified at a value to generate a desired recipe, for example, for each polyolefin grade or product, and to give the desired properties of the downstream polyolefin pellets. Furthermore, the additive 198 addition may be accomplished with a liquid additive system, loss-in-weight-feeders, and the like. In certain embodiments, one or more of lost-in-weight feeders may be used to meter a pre-mixed additive package fed from a bulk container, for example, to the extruder 190 via the fluff 136 stream, an extruder feed hopper, directly to the extruder 190, and so on.

With the elimination of storage silos between the purge column and the associated fluff residence time, the polymerization rate (as discussed with respect to FIG. 8) may be more closely coupled in operation with the extrusion rate (see FIG. 14). Techniques may be implemented in the operation of the polymerization reactor 110 in reactor system 20 (FIG. 8) to allow the reactor 110 to "back off" on production rate of polyolefin fluff, for example, to accommodate upsets in the downstream extrusion/loadout system 36 that may have been accommodated by the surge capacity of a fluff silo. For example, if the extruder 190 is shut down temporarily, the polymerization reactor 110 may be subjected to a "mini-kill" or a "partial-kill," where a relatively small portion (e.g., part per billion range) of catalyst poison, such as carbon monoxide, is injected into the reactor 110 to temporarily "kill" the polymerization. Thus, if a temporary shut down of the extruder 190 or other equipment in the extrusion/loadout system 36 occurs, the discharge of polyolefin fluff 136 is temporarily stopped or reduced from the reactor 110 discharge 22 due to lack of polymerization in the reactor 110. Therefore, the residence time in the purge column 132 may be adequate to retain the incoming fluff 136 until the extruder operation is restarted.

In other embodiments, one or more silos (not shown) may be used for the temporary storage of fluff from the reactor. These silos may include an extruder fluff silo and, optionally, one or more fluff storage silos. While the extra silos may decrease the use of complex control schemes to balance production rates between the reactor 110 and the extruder 190, they may increase plant construction and operating costs, for example, by increasing energy demand for blowers to convey the fluff between silos.

In general, the extruder 190 may melt, homogenize, and pump the polyolefin polymer and additives through a pelletizer 200, which may include a screen pack and heated die head, for example, which pelletizes the mixture of fluff and additives. Further, pelletizer knife blades (i.e., under water) may cut the polyolefin melt extruded through the die into pellets. The pellets may be quenched by water 202 and may travel in a pellet-water slurry 204 from the pelletizer 200 to a pellet dewatering dryer 206. The dryer 206 may separate the free water and then dry the remaining surface water from the pellets by centrifugal force. The dried pellets 208 may discharge onto a scalping screen 210, for example, which removes oversized and undersized pellets from on-specification pellets 212.

Water 202 may be supplied to the pelletizer 200 from a water tank 214 via a centrifugal pump 216 and cooler 218 (e.g., shell and tube heat exchanger). Water 219 removed from the pellet dryer 206 may return to the water tank 214. The polyolefin pellets 212 exiting the scalping screen 210 may fall by gravity through a rotary valve 220 into a dense-phase pneumatic conveying line 222, for example, and transported to pellet silos 224. The pellet silos may include storage tanks, blenders, off-specification storage tanks, and so on. In the illustrated embodiment, the blower package 226 provides nitrogen and/or air 228 to convey the pellets 212 via conveying line 222 to the pellet silos 224. Polyolefin pellets 226 may be loaded into rail cars 228, hopper cars, trucks, tote bins, bags, and so on. Pellets 226 may be loaded into rail cars 228, for example, using a gravity type, air assisted, multiple-spout, loading system. Such a system may allow the hopper car to be automatically loaded at a rate higher than the polymerization and extrusion production rate. Thus, extra "time" generated by the higher loadout rates may be exploited to provide time to move the hopper cars or rail cars after filling, and to spot the next empty car 228.

While the techniques disclosed above may be susceptible to various modifications and alternative forms, specific embodiments have been shown by way of example in the drawings. However, it should be understood that the techniques are not intended to be limited to the particular forms disclosed. Rather, the techniques encompass all modifications, equivalents and alternatives falling within the spirit and scope of the techniques as defined by the following appended claims.

What is claimed is:

1. A method of operating a linear low-density polyethylene (LLDPE) reactor, comprising:
combining a catalyst with a diluent mixture in a polymerization reactor, wherein the diluent mixture comprises a diluent and an olefin monomer;
operating the polymerization reactor above a critical pressure of the diluent mixture and below a critical temperature of the diluent mixture;
forming a slurry comprising LLDPE particles and the diluent mixture in the polymerization reactor, wherein operating the polymerization reactor above the critical pressure of the diluent mixture and below the critical temperature of the diluent mixture comprises maintaining the LLDPE particles in a solid state and the diluent mixture in a compressible state;
discharging the slurry from the polymerization reactor;
separating a majority of the diluent mixture from the slurry with a recovery system; and
controlling, with one or more controllers, a pressure of the polymerization reactor above the critical pressure of the diluent mixture and a temperature of the polymerization reactor below the critical temperature of the diluent mixture based at least in part on a detected composition of the diluent mixture such that the diluent mixture is maintained in the compressible state and two phase flow of the diluent mixture is prevented within the polymerization reactor.

2. The method of claim 1, wherein the diluent comprises propane, butane, or isobutane, or any combination thereof at a pressure above a critical pressure of the diluent mixture and at a temperature below a critical temperature of the diluent mixture.

3. The method of claim 1, wherein the diluent mixture comprises a blend of two or more hydrocarbons that each independently comprises six or less carbons.

4. The method of claim 1, comprising continuously removing the LLDPE particles from the reactor during the polymerization process.

5. The method of claim 1, comprising injecting a kill agent into the reactor to slow a production rate or to decrease the temperature of the polymerization reactor.

6. The method of claim 1, comprising operating the polymerization reactor at a temperature of between about 170° F.

and about 195° F., at a pressure above about 750 psia, and wherein the diluent comprises propane.

7. The method of claim 1, comprising operating the polymerization reactor at a temperature of between about 170° F. and about 195° F., at a pressure between about 800 psia and about 900 psia, and wherein the diluent comprises propane.

8. A process for manufacturing a product comprising a linear low-density polyethylene (LLDPE), the process comprising:
  manufacturing the product at least a portion of which comprises the LLDPE, wherein the LLDPE is produced by a method comprising:
    determining a critical pressure and a critical temperature of a diluent mixture comprising a diluent and an olefin monomer;
    combining a catalyst with the diluent mixture in a polymerization reactor;
    operating the polymerization reactor above the critical pressure of the diluent mixture, and below the critical temperature of the diluent mixture, such that the diluent mixture is compressible and two phase flow of the diluent mixture is prevented within the polymerization reactor;
    forming a slurry comprising LLDPE particles and the diluent mixture in the polymerization reactor, wherein the slurry comprises solid particles suspended in a liquid medium;
    discharging the slurry from the polymerization reactor;
    separating a majority of the diluent mixture from the slurry with a recovery system; and
    maintaining, with one or more controllers, a pressure of the polymerization reactor above the critical pressure of the diluent mixture and a temperature of the polymerization reactor below the critical temperature of the diluent mixture based at least in part on a detected composition of the diluent mixture.

9. The process of claim 8, wherein the diluent mixture comprises a blend of two or more hydrocarbons that each independently comprises six or less carbons.

10. The process of claim 8, comprising operating the reactor at a temperature of between about 170° F. and about 195° F., at a pressure above about 750 psia, and wherein the diluent comprises propane.

11. The process of claim 8, comprising operating the polymerization reactor at a space-time yield greater than approximately 2.6, wherein the space-time yield is measured in pounds of polymer produced per hour for each gallon of reactor volume.

12. The method of claim 1, comprising determining the pressure above the critical pressure of the diluent mixture and the temperature below the critical temperature of the diluent mixture by modeling a phase diagram of the diluent mixture.

13. The method of claim 1, wherein controlling the temperature of the polymerization reactor below the critical temperature of the diluent mixture comprises maintaining a temperature difference between a first temperature of coolant at an inlet to a reactor jacket and a second temperature of the coolant at an outlet of the reactor jacket to less than 15° Fahrenheit using the one or more controllers.

14. The of claim 8, wherein determining the critical pressure of the diluent mixture and the critical temperature of the diluent mixture comprises modeling a phase diagram of the diluent mixture.

15. The method of claim 8, wherein maintaining the temperature of the polymerization reactor below the critical temperature of the diluent mixture comprises maintaining a temperature difference between a first temperature of coolant at an inlet to a reactor jacket and a second temperature of the coolant at an outlet of the reactor jacket to less than 15° Fahrenheit using the one or more controllers.

* * * * *